US009039519B2

(12) United States Patent
Augustine

(10) Patent No.: US 9,039,519 B2
(45) Date of Patent: May 26, 2015

(54) ELECTRONIC GAMING DEVICE WITH AUTO-PLAY FUNCTIONALITY

(71) Applicant: Jerish Augustine, Snellville, GA (US)

(72) Inventor: Jerish Augustine, Snellville, GA (US)

(73) Assignee: CADILLAC JACK, INC., Duluth, GA (US)

( * ) Notice: Subject to any disclaimer, the term of this patent is extended or adjusted under 35 U.S.C. 154(b) by 0 days.

(21) Appl. No.: 13/693,872

(22) Filed: Dec. 4, 2012

(65) Prior Publication Data

US 2014/0155135 A1 Jun. 5, 2014

(51) Int. Cl.
*A63F 13/00* (2014.01)
*G07F 17/32* (2006.01)

(52) U.S. Cl.
CPC ........ *G07F 17/3267* (2013.01); *G07F 17/3209* (2013.01); *G07F 17/3227* (2013.01)

(58) Field of Classification Search
CPC . G07F 17/3244; G07F 17/32; G07F 17/3267; G07F 17/3276; G07F 17/3211; G07F 17/3239; G07F 17/323; G07F 17/3209; G07F 17/3232; G07F 17/3258; G07F 17/3262; G07F 17/34; A63F 13/10; A63F 13/12; A63F 2007/0064; A63F 2300/406; A63F 2300/409; A63F 2300/50; A63F 2300/5533; A63F 2300/6036; A63F 2300/609; A63F 2300/636; A63F 2300/807; A63F 3/00072
USPC ............ 463/16–20, 22, 25, 29, 36, 40, 42, 43
See application file for complete search history.

(56) References Cited

U.S. PATENT DOCUMENTS

| | | | | |
|---|---|---|---|---|
| 6,012,983 | A * | 1/2000 | Walker et al. | 463/20 |
| 6,244,957 | B1 * | 6/2001 | Walker et al. | 463/20 |
| 2003/0114217 | A1 * | 6/2003 | Walker et al. | 463/20 |
| 2006/0068893 | A1 * | 3/2006 | Jaffe et al. | 463/20 |
| 2007/0054729 | A1 * | 3/2007 | Hornik et al. | 463/16 |
| 2009/0005145 | A1 * | 1/2009 | White | 463/16 |
| 2013/0090164 | A1 * | 4/2013 | Moshal | 463/31 |

* cited by examiner

*Primary Examiner* — Sunit Pandya
(74) *Attorney, Agent, or Firm* — CF3; Stephen Eisenmann

(57) ABSTRACT

Examples disclosed herein relate to systems and methods, which may receive wagers on one or more paylines. The systems and methods may utilize one or more auto-play game functionality. The systems and methods may determine one or more payouts based on the one or more auto-play game functionality. The systems and methods may display one or more presentations based on the one or more auto-play game functionality.

20 Claims, 18 Drawing Sheets

FIG. 5C

505

507 509

AUTO PLAY HELP

| PARAMETER | EXAMPLE (PARAMETER VALUE IS INDICATED BY [ ]) |
|---|---|
| Time duration | You want to Auto Play at most [10] minutes only |
| Positive credit | Auto Play until your credit reaches [200] |
| Negative credit | You want to quit Auto Play if your credit falls below [50] |
| Losing streak | Quit Auto Play if you don't win for [10] straight games |
| Winning streak | You want to quit Auto Play if you've won [5] straight games |
| Single winning total | Quit Auto Play if a single game wins over [100] credits |
| Winning play count | You want to quit Auto Play after a total of [5] winning games |
| Losing play count | Quit Auto Play after a total of [20] losing games |
| Number of games | You want to Auto Play at most [100] games |
| Amount spent | Auto Play until a total of [50] credits is spent |
| Percentage lost | Quit Auto Play if [50] out of [100] games didn't win anything |
| Percentage won | Quit Auto Play if [50] out of [100] games win |
| Jackpot event | You want to quit Auto Play if you hit a [TOP AWARD] |

YOU MAY CANCEL AUTO PLAY BY TOUCHING THE "AUTO PLAY" BUTTON

- YOU MAY SELECT A VALUE FOR A GIVEN PARAMETER FROM A LIST OF AVAILABLE OPTIONS.
- EACH PARAMETER MAY BE EXCLUSIVE, OR COMBINED. BASED ON THE ABOVE EXAMPLE, YOU MAY WANT TO AUTO PLAY FOR 10 MINUTES ONLY. OR YOU MAY WANT TO SPECIFY A "TIME DURATION" AND A "POSITIVE CREDIT" TO AUTO PLAY FOR 10 MINUTES OR UNTIL YOUR CREDIT REACHES 200, WHICHEVER TRIGGERING EVENT OCCURS FIRST.

ELECTRONIC GAMING DEVICE WITH AUTO-PLAY FUNCTIONALITY

FIELD

The subject matter disclosed herein relates to an electronic gaming device. More specifically, the disclosure relates to an electronic gaming device, which provides game play with one or more auto-play functionalities. Further, the disclosure relates to utilizing auto-play functionality and auto-play presentations in the base game and/or the bonus game to enhance the gaming experience.

INFORMATION

The gaming industry has numerous casinos located both worldwide and in the United States. A client of a casino or other gaming entity may gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successful matches the predetermined winning symbols in one of the predetermined patterns. One or more combinations of symbols may generate a bonus game.

During a game playing session, players may become tired and/or distracted which may reduce the number of games, which may be played during this game playing session. This reduction in game play may reduce the player's enjoyment and the revenue generated for the gaming entity. A new way of delivering game play may include providing auto-play functionality and/or auto-play presentations in the base game and/or the bonus game.

BRIEF DESCRIPTION OF THE FIGURES

Non-limiting and non-exhaustive examples may be described with reference to the following figures, wherein like reference numerals refer to like parts throughout the various figures.

FIG. 5C is an illustration of an auto-play help menu, according to one embodiment.

DETAILED DESCRIPTION

Figure 1:
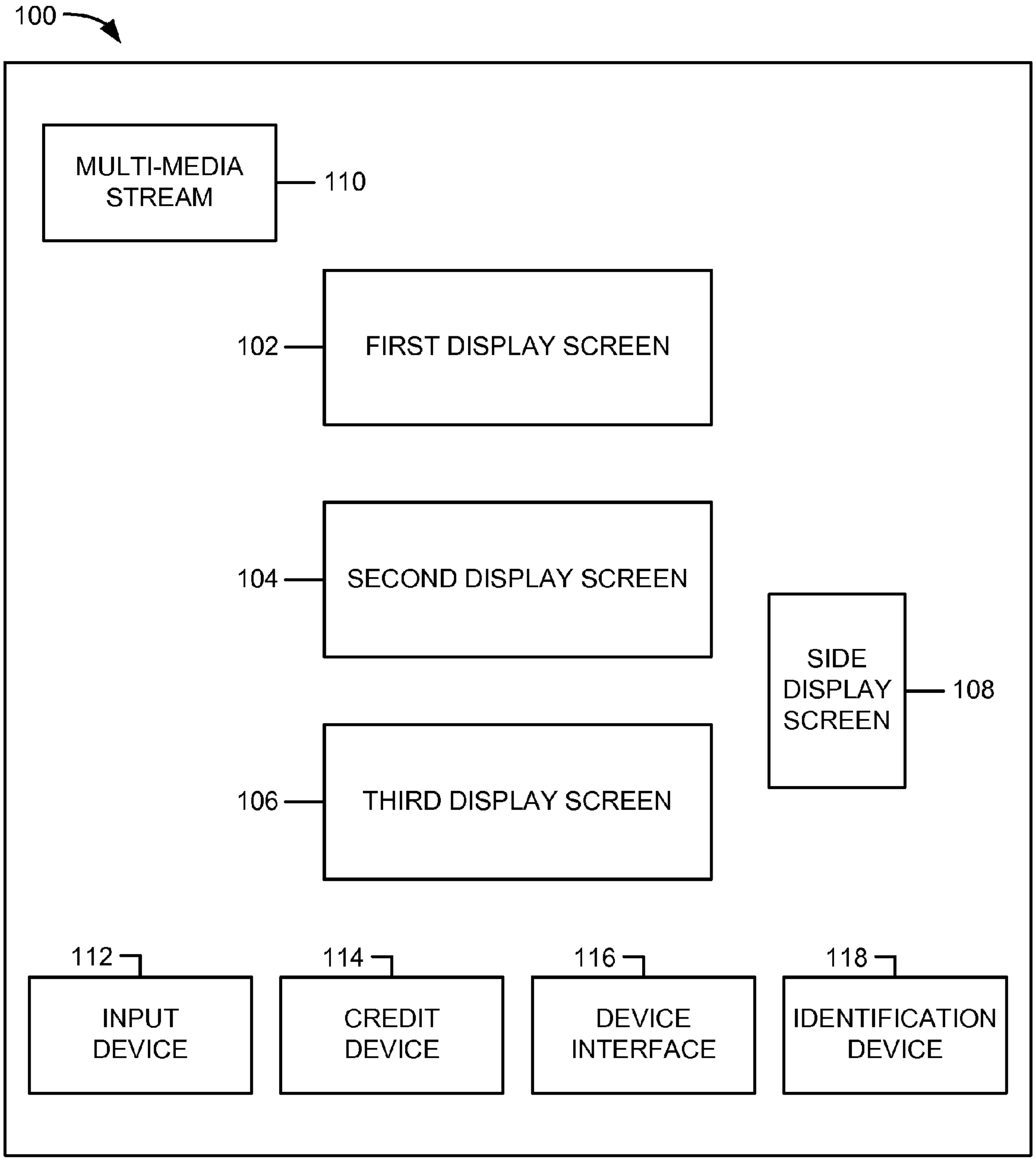
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to select auto-play, to select auto-play criteria, to select one or more auto-play gaming functionality, to control any object, to control any gaming feature, to select one or more pattern gaming options, to obtain data relating to historical payouts, to select a row and/or column to move, to select a row area to move, to select a column area to move, to select a symbol to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), and/or any combination thereof. These selections may occur via any other input device (e.g., a touch screen, voice commands, etc.).

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more auto-play functionalities (e.g., auto-play profile 1, auto-play profile 2, auto-play profile 3, etc.) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have game play options, which have only auto-play functionality (or similar functionality). Therefore, no games without auto-play functionality would be presented. In another example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player may be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 may then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

Figure 2:
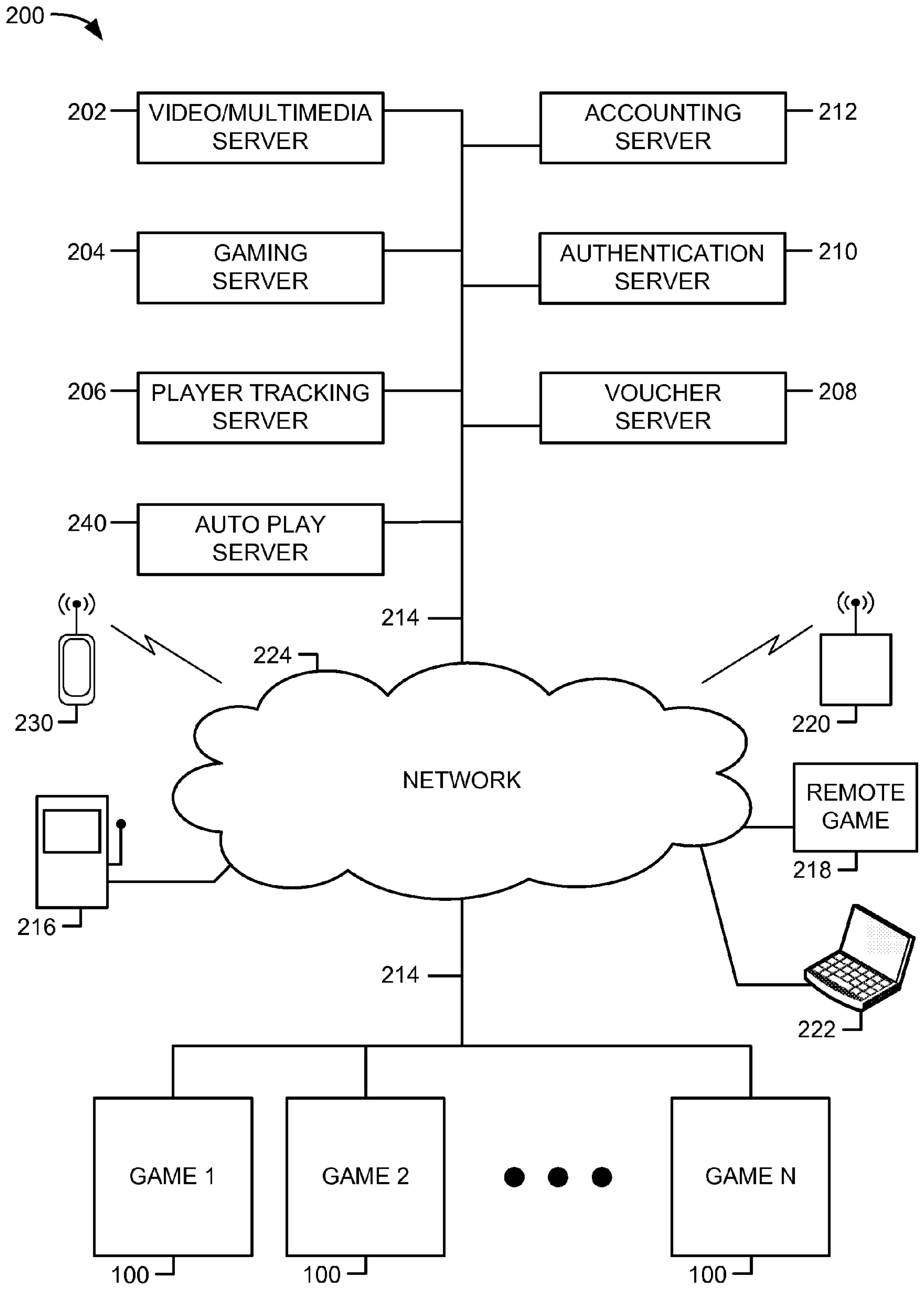
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, an accounting server 212, and an auto-play server 240.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, an auto-play functionality, an auto-play evaluation functionality, other game functionality, and/or any virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include auto-play game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

Auto-play server 240 may generate, compile, track, and/or store data relating to one or more auto-play games, auto-play profiles, auto-play gaming results, and/or any data relating to auto-play. Auto-play server 240 may relate any of this data to one or more players. For example, player 1 may prefer an auto-play gaming profile, which focuses on limiting the amount of money lost. Whereas, player 2 may prefer an auto-play gaming profile, which focuses on doubling up their initial credit amount.

A statistics server may be used to maintain data relating to historical game play for one or more electronic gaming devices 100. This historical data may include winning amounts, auto-play criteria, auto-play profiles, auto-play winning frequency, any other auto-play data, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Statistics server may include data relating to one or more auto-play game play (or similar game play). This data may include the number of times a specific item (e.g., auto-play criteria 1, auto-play profile 1, auto-play criteria 2, etc.) was selected. The frequency of any specific item being selected and the amount won. For example, when an auto-play shut off of 100% gain is selected, a player wins 52% of the time (e.g., start with $100 and stop if balance reaches $200). This data may also include data relating to any interrelationship of elements. For example, when X number (e.g., 50) of spins is selected, a 50% stop loss is selected 35% of the time.

Figure 3:
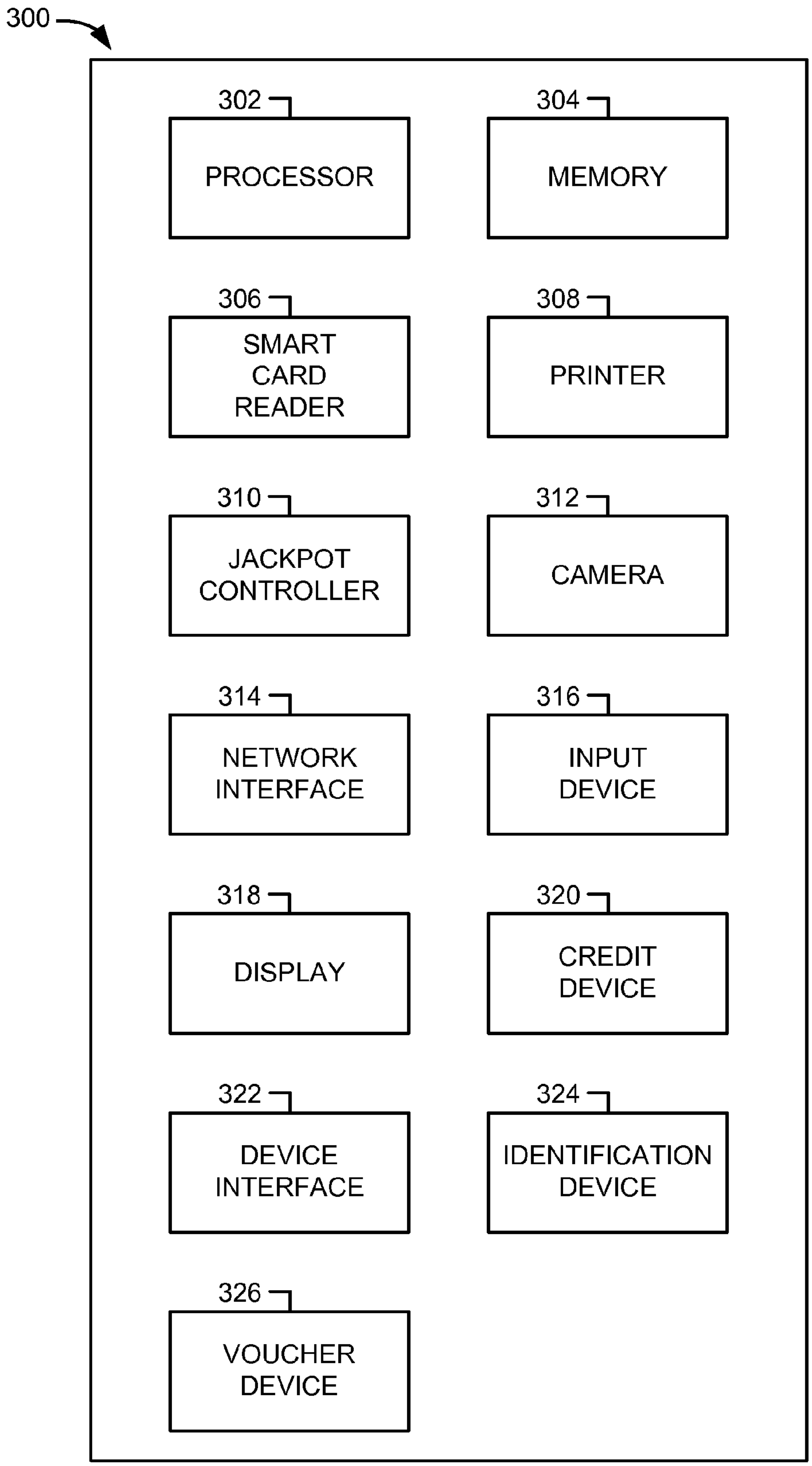
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, accounting server 212, and/or auto-play server 240.

Input device 316 may be mechanical buttons, electronic buttons, a touch screen, and/or any combination thereof. Input device 316 may be utilized to make a wager, to select auto-play, to select auto-play criteria, to select one or more game elements, to select one or more auto-play functionality, to make an offer to buy or sell a voucher, to determine a vouchers worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, auto-play profiles, auto-play criteria, an auto-play element, an auto-play functionality, and/or the tables utilized may be modified based on player preference data.

For example, a player may have selected a specific baseball team (e.g., Atlanta Braves) under the sporting event preferences, the electronic gaming device 100 may then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
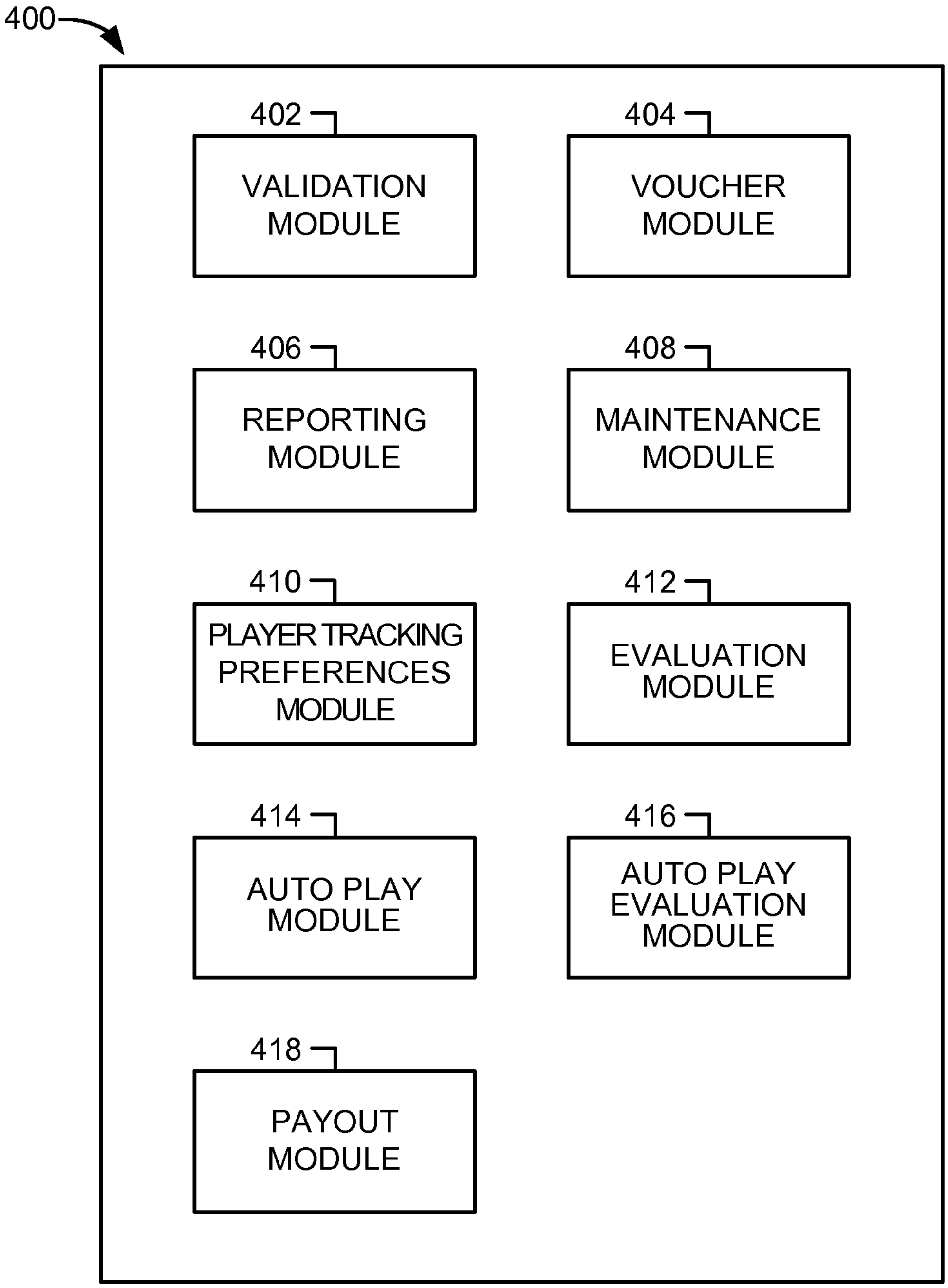
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, an evaluation module 412, and auto-play module 414, an auto-play evaluation module 416, and/or a payout module 418.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may evaluate one or more outcomes for one or more events which may not be based on one or more outcomes for one or more auto-play based game play. Evaluation module 422 may evaluate one or more outcomes for one or more events which may be based on one or more outcomes for one or more auto-play based game play.

Auto-play module 414 may generate, compile, track, and/or store data relating to one or more auto-play games, auto-play profiles, auto-play gaming results, and/or any data relating to auto-play. Auto-play module 414 may relate any of this data to one or more players. For example, player 1 may prefer an auto-play gaming profile, which focuses on limiting the amount of money lost. Whereas, player 2 may prefer an auto-play gaming profile, which focuses on doubling up their initial credit amount.

Auto-play evaluation module 416 may evaluate one or more outcomes for one or more events which may be based on one or more outcomes for one or more auto-play based game play.

Payout module 418 may determine one or more payouts which may relate to one or more inputs received from the player, electronic gaming device 100, and/or electronic gaming system 200.

A bonus module may generate a bonus game, evaluate the results of the bonus game, trigger bonus game presentations, generate bonus game payouts, and/or display any data relating to the bonus game.

A presentation generation module may generate the presentation data (e.g., visual and audio) relating to one or more game play options. A presentation module may display one or more of the generated presentations.

It should be noted that one or more modules may be combined into one module. Further, there may be one evaluation module where the determined payout does not depend on whether there were any wild symbols, scatter symbols, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5A:
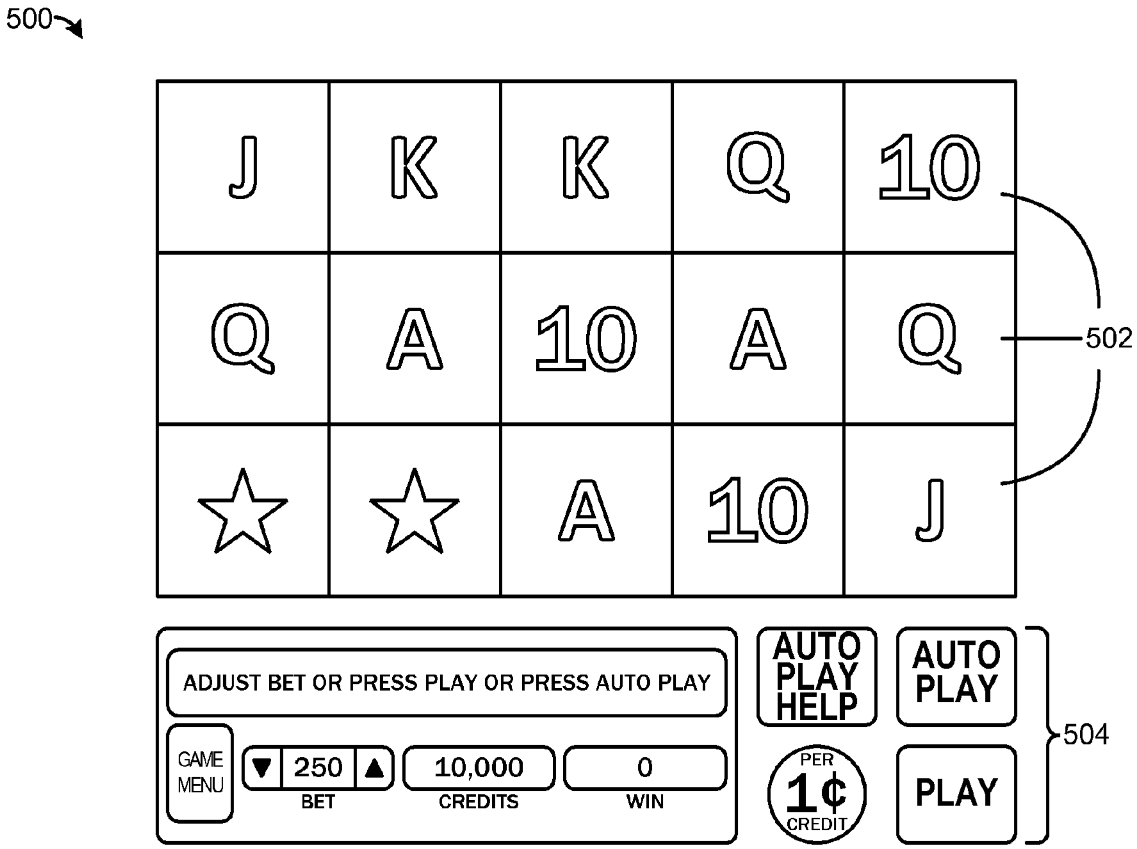
FIG. 5A is an illustration of an auto-play game play with a game menu, according to one embodiment.

FIG. 5A is an illustration of an auto-play game play with a game menu, according to one embodiment. A first image 500 may include a plurality of reels 502 and a game menu area 504. First image 500 may give the player the option to play using an auto-play game option and/or a manual game play option. The auto-play game option may allow the player to initiate auto-play functionality for any number (e.g., one, two, three, ten, etc.) of spins and then turn the auto-play function off. Plurality of reels 502 may contain images. For example, a bar, a number, an icon, a picture, and/or any other image may be utilized. These images may change vertically, horizontally, and/or in any pattern. A game menu area 504 may utilize buttons (and/or display images) to allow the player to select different options (e.g., a player may select the Auto Play button to an auto-play mode, the player may increase or decrease the bet size by using the increase bet button or decrease bet buttons, the player may change the game play increments amount by using the increment button, etc.). Any of these buttons may move in any way (e.g., wiggle, blink, expand, shrink, etc.).

Figure 5B:
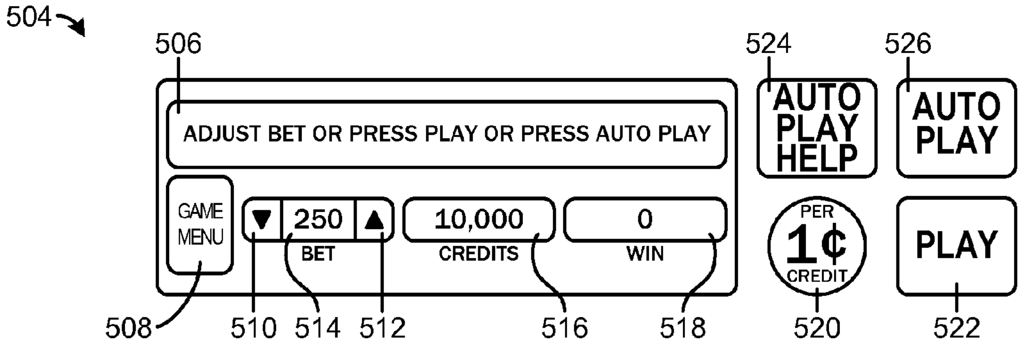
FIG. 5B is an illustration of a game menu, according to one embodiment.

FIG. 5B is an illustration of a game menu, according to one embodiment. Game menu area 504 may include a message area 506, which may state, "adjust bet or press play or press auto play button." Game menu area 504 may also include a game menu button 508, a bet decrease button 510, a current bet amount area 514, an increase bet image 512, a total credit image 516, a total winning amount image 518, an auto play help button 524, an auto play button 526, a bet increment button 520, and a play button 522. Message area 506 may blink, move up and down, may be highlighted, change size, or be manipulated in any other way. The wording in message area 506 may also be changed. Game menu button 508 may be used to take the player to game menu 508 to display and/or change different options for the game. This may include changing the type of game (e.g., lucky sevens across a row may signify a winning combination, a royal flush may signify a winning combination, a row or column of stars may signify a winning combination, changing gaming options, baccarat gaming options, blackjack gaming options, poker gaming options, etc.). The player may also change the settings for the game (e.g., changing the volume of the game, the player preferences on the player's card, the images used on the plurality of reels, etc.), and/or any number of other game choices. Bet decrease button 510 may be used by the player to decrease the current bet by any number increments (e.g., 1, 2, 3, 4, 5, 10, 100, etc.). Current bet amount 514 is the betting amount for the current game (e.g., 1, 5, 10, 50, 250, 255, 300, 400, 500, 1000, etc.). Increase bet button 512 may be used by the player to increase the current bet by any number increments (e.g., 1, 2, 3, 4, 5, 10, 100, etc.). Total credit image 516 may display the credits available to the player at any given time (e.g., if a player has 10,000 credits and then plays a game for 200 credits and losses, the total credit image 516 would display 9,800 credits available). Total winning amount image 518 may display the amount a player has won during the last game play (e.g., if a player has won three games, betting 100 credits each time, the winning amount image 518 would display 100). Auto play help button 524 may give the player instructions on how to use one or more auto-play functions (e.g., instructions for how to turn auto-play mode off, how to engage auto-play mode, different criteria options for auto-play mode, etc.). Auto play button 526 may begin the one or more auto-play functions. Bet increment button 520 may be used to change the betting amount per credit (e.g., 1¢, 5¢, 25¢, 50¢, $1, $5, etc.). Play button 522 may engage electronic gaming device 100 and/or electronic gaming system 200 in normal play mode.

FIG. 5C is an illustration of an auto-play help menu, according to one embodiment. An auto play help 505 image may include one or more parameters 507 and one or more example 509 (e.g., parameter value is indicated by). One example may be if a player wants to set a parameter for a time duration of auto-play to at most 10 minutes. The player may choose any amount of time (e.g., 1 minute, 5 minutes, 10 minutes, 30 minutes, 1 hour, 5 hours, etc.). Another example may be if a player wants to change the parameter relating to positive credits. The auto-play functionality may continue until the player's credits reach a certain chosen amount (e.g., 1, 50, 100, 200, 300, 500, 1000, etc.). Another example may be if a player wants to change the negative credit parameter. The player may select that auto-play mode turns off after his/her credits fall below a certain amount (e.g., 1, 10, 20, 40, 50, 100, 1000, etc.). Another parameter a player may change may be related to a losing streak. For example, the auto-play functionality may be ended if the player does not win for a set amount of straight games (e.g., 1, 5, 10, 15, 20, 30, 50, etc.).

Another parameter a player may manipulate may be related to a winning streak. For example, a player may decide to have auto-play functionality turn off after winning a set number of games in a row (e.g., 1, 5, 10, 40, 50, etc.).

In another example, a player may want to set a single winning total amount. This option may turn off the auto-play functionality after a certain number of total winning games (e.g., 1, 5, 10, 15, 20, 50, etc.) are achieved. A player may also want to set the single winning total amount. This option may turn off the auto-play functionality after a single game wins over a certain number of credits (e.g., 1, 10, 50, 100, 200, 500, 1000, etc.). A player may want to set the winning play count amount. This option may turn off the auto-play functionality after a certain total of winning games is achieved (e.g., 1, 5, 10, 15, 20, 50, etc.).

In another example, a player may want to set the losing play count. This option may turn off the auto-play functionality after a certain total of losing games had occurred (e.g., 1, 5, 10, 15, 20, 50, etc.). A player may want to have the auto-play functionality turn off after a certain number of games had been played (e.g., 1, 5, 10, 20, 50, 100, etc.). A player may want to have the auto-play functionality turn off after a certain amount of credits have been spent (e.g., 1, 5, 50, 100, 200, 500, 1000, etc.). A player may want to have the auto-play functionality turn off after a certain percentage lost (e.g., 50 out of 100, 40 out of 60, 3 out of 9, etc.). A player may want to have the auto-play mode turn off after a certain percentage of games have been won (e.g., 50 out of 100, 40 out of 60, 3 out of 9, etc.). A player may want to select the jackpot parameter. This may turn off the auto-play functionality after a certain award has been achieved (e.g., top award, double bonus, triple bonus, progressive, etc.). The auto-play help screen may state that a player may click the auto-play button at any time to turn off the auto-play mode. There may be a verification request to ensure that the player wants to cancel auto-play. For example, do you want to cancel auto-play, if so please press the auto-play button again may be shown on a display. The auto-play help image may explain that a player may select a value for a given parameter from a list of available options. Each parameter may be exclusive, or combined (e.g., A player may combine the auto-play functionality parameters of auto-play continuing for 10 minutes only with the auto-play stopping after the player's credit reaches 200 option. The player may select if they want both criteria to happen before the auto-play turns off, if they want only one to happen before the auto-play turns off, or if they want electronic gaming device 100 and/or electronic gaming system 200 to decide if the criteria should both be met, one met, or a combination of factors before stopping auto-play mode). Electronic gaming device 100 and/or electronic gaming system 200 may select any number of criteria (e.g., 1, 2, 5, 10, etc.) to play together, exclusively, or in some predetermined way. For example, electronic gaming device 100 and/or electronic gaming system 200 may combine the auto-play functionality parameters of auto-play continuing for 10 minutes only with the auto-play stopping after the player's credit reaches 200 option, and with the auto-play continuing until the player has won five games. Electronic gaming device 100 and/or electronic gaming system 200 may be set by the casino or manufacturer to select criteria in a certain order based on the player's identification card, randomly, using the player's history, by a predetermined pattern, shuffle, any combination thereof, and/or any other selection method.

Figure 5D:
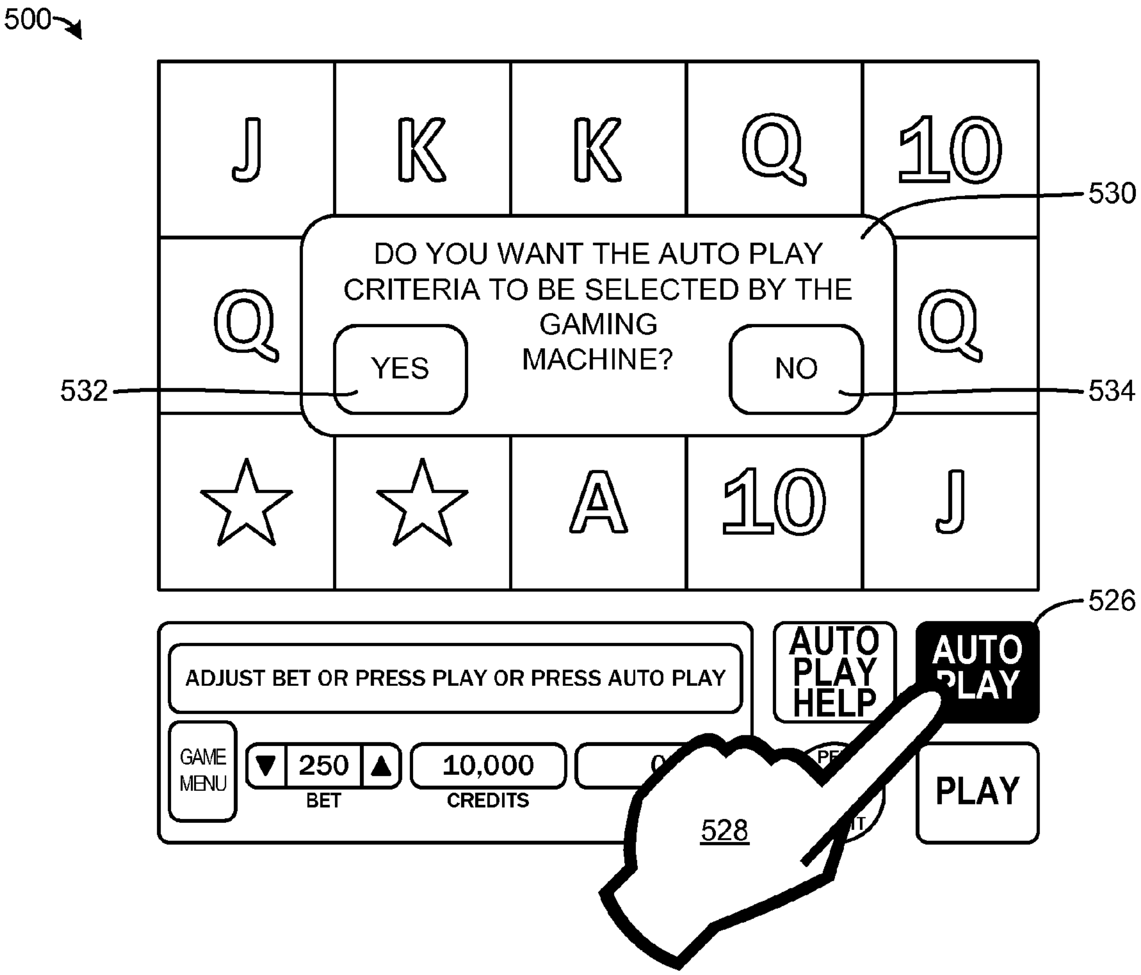
FIG. 5D is an illustration of an auto-play help window, according to one embodiment.

FIG. 5D is an illustration of an auto-play help window with a game menu, according to one embodiment. First image 500 may include a pop-up window 530, a yes button 532, a no button 534, auto-play button 526, and a hand selector icon 528. Hand selector icon 528 may allow a player to select certain buttons on the screen. With the selector the player may click on any of the buttons (e.g., the game menu, auto play help, play, auto play, etc.). Auto-play button 526 may be clicked to begin the auto-play mode. The auto-play functionality option may be offered to only an elite group of players selected by the casino, which could be due to bet size, winning amount, regular attendance, etc. This information may be stored on the player's identification card or in any other location. The auto-play functionality may offer elite prizes, such as special events, concerts, comps, and/or any other prize. Once auto-play 526 button is clicked, pop-up window 530 may ask the player if they want the auto-play criteria to be selected by electronic gaming device 100 and/or electronic gaming system 200. Pop-up window 530 may flash, pulse, and/and/or move in any way. If the player wants electronic gaming device 100 and/or electronic gaming system 200 to determine the type of auto-play functionality, the player may select yes button 532. If the player would like to set their own criteria for auto-play functionality, the player may select no button 534. If a player selects yes button 532, the electronic gaming device 100 and/or electronic gaming system 200 may determine which criteria to use for auto-play functionality. Electronic gaming device 100 and/or electronic gaming system 200 may base this decision on one or more of a player's preferred favorite methods stored on their player's card, a list of profiles saved on the player's card, a preset order, by a predetermined pattern, shuffle, any combination thereof, and/or any other selection method. A player may choose to save certain profiles on their player's card that include certain criteria for auto-play functionality (e.g., Profile 1, Profile 2, Monday Profile, Tuesday Profile, Lucky Profile, etc.). A player may save certain criteria as a profile (e.g., if a player has selected to auto-play for 10 minutes and for the auto-play to continue until a winning streak of 5 straight games, the player may save this criteria as a profile to use at a later time. The player may name the profile "Monday Profile", "Winningest Profile", or any other name. The player may choose any combination of auto-play criteria to save as a profile). Once the player selects yes button 532, electronic gaming device 100 and/or electronic gaming system 200 may list the auto-play functionality criteria that is about to be played. The player may then say if they would like to continue, or if they would like to change the auto-selected criteria (e.g., for example, the player selects yes button 532 and electronic gaming device 100 and/or electronic gaming system 200 may state the game criteria is going to be continuous play until 20 losing games in a row. The player may then agree to this, ask electronic gaming device 100 and/or electronic gaming system 200 to choose different criteria, or select criteria of their own).

Figure 6A:
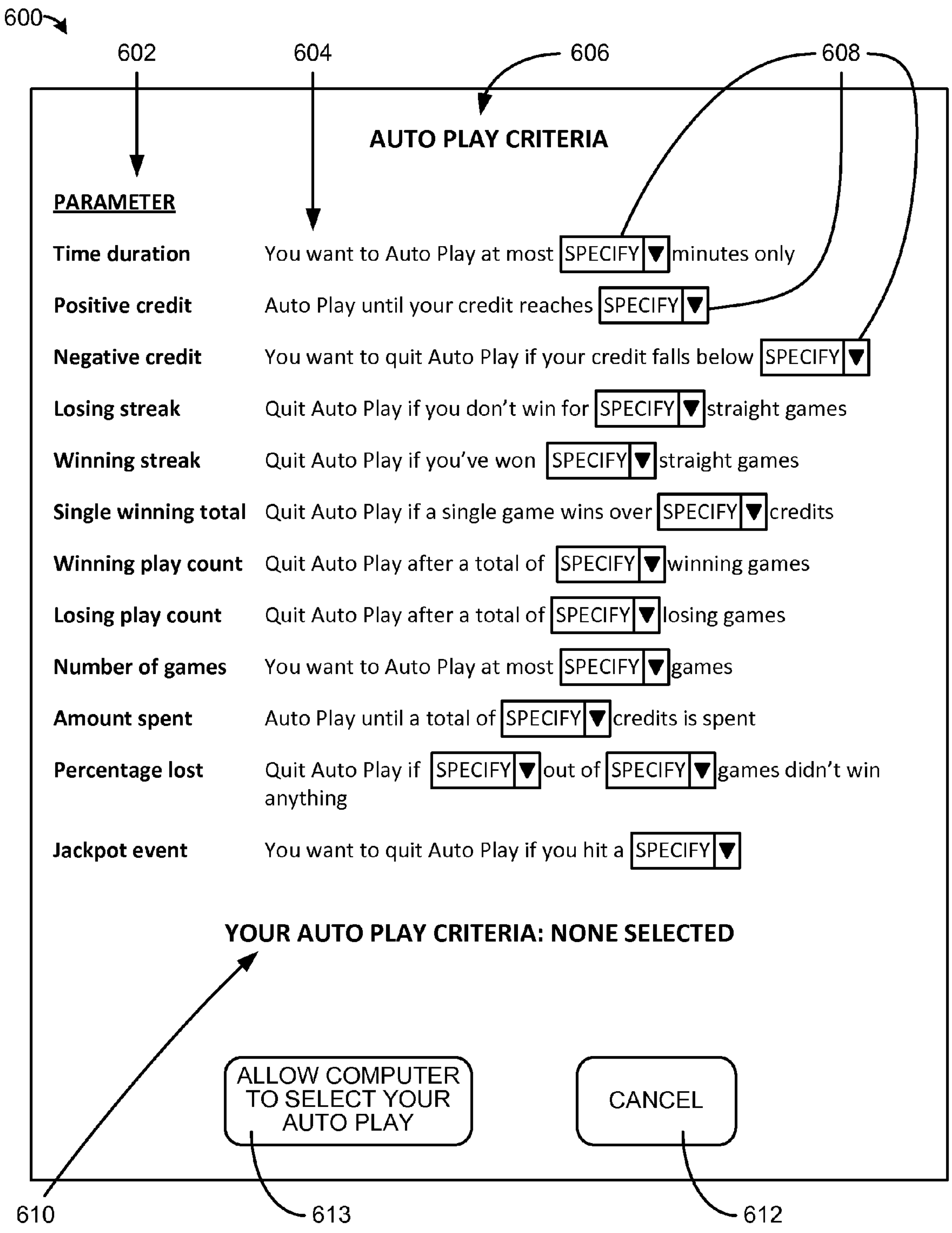
FIG. 6A is an illustration of an auto-play criteria menu, according to one embodiment.

FIG. 6A is another illustration of an auto-play criteria menu, according to one embodiment. A second image 600 may include an auto-play criteria 606, parameters 602, an example of each parameter 604, one or more drop-down menus 608, a selected criteria 610, a computer select auto-play button 613, and a cancel button 612. Auto-play criteria 606 may be a menu of options a player may choose from in order to adapt their auto-play functionality experience. Any combination of parameters may be selected for play. Parameters 602 may include one or more of a time duration, a positive credit, a negative credit, a losing streak, a winning streak single winning total, a winning play count, a losing play count, number of games, an amount spent, a percentage lost, and a jackpot event. One or more drop-down menus 608 may represent a pull-down menu, a fill-in area, a voice-recognition box, and/or any other data entry image. An example of each parameter 604 may include the player wants to auto-play at most _X_ minutes only (e.g., X=1, 5, 10, 70, 500, 1000, 10000, etc.), auto-play until your credit reaches _X_ (e.g., X=1, 5, 10, 70, 500, 1000, 10000, etc.), you want to quit auto-play if your credit falls below _X_ (e.g., X=1, 5, 10, 70, 500, 1000, 10000, etc.), quit auto-play if you don't win for _ X_ straight games (e.g., X=1, 5, 10, 70, 500, 1000, 10000, etc.), quit auto-play if you've won _X_ straight games (e.g., X=1, 5, 10, 70, 500, 1000, 10000, etc.), quit auto-play if a single game wins over _X_ credits (e.g., X=1, 5, 10, 70, 500, 1000, 10000, etc.), quit auto-play after a total of _X_ winning games (e.g., X=1, 5, 10, 70, 500, 1000, 10000, etc.), quit auto-play after a total of _X_ losing games (e.g., X=1, 5, 10, 70, 500, 1000, 10000, etc.), you want to auto-play at most _ X_ games (e.g., X=1, 5, 10, 70, 500, 1000, 10000, etc.), auto-play until a total of _X_ credits is spent (e.g., X=1, 5, 10, 70, 500, 1000, 10000, etc.), quit auto-play if _X_ out of _Y_ games didn't win anything (e.g., X=1, 5, 10, 70, 500, 1000, 10000, etc. and Y=2, 3, 4, 9, 15, 50, 100, 500, 5000, etc.), and you want to quit auto-play if you hit a jackpot. The player may select one parameter, any combination of any of the parameters, and/or ask electronic gaming device 100 and/or electronic gaming system 200 to chose the parameters before beginning auto-play (e.g., The player may select quit auto-play if you've won _X_ straight games option and also you want to auto-play at most _Y_ games option (e.g., X=1, 5, 10, 70, 500, 1000, 10000, etc. and Y=2, 3, 4, 9, 15, 50, 100, 500, 5000, etc.). The game may play until whichever of the parameters happens first and then turn-off the auto-play mode, or the game may be set to continue playing until all events have been finished).

In another example, the player may select that electronic gaming device 100 and/or electronic gaming system 200 chooses the criteria for the auto-play functionality. Electronic gaming device 100 and/or electronic gaming system 200 may chose one parameter, more than one parameter, a combination of parameters that may be needed to be completed before the auto-play mode turns off, a number of parameters where only one needs to be satisfied before the auto-play functionality turns off, a saved profile from the player's identification card, a predetermined assigned order, by a predetermined pattern, shuffle, any combination thereof, and/or any other selection method.

Electronic gaming device 100 and/or electronic gaming system 200 may chose that all criteria need to be satisfied, only a select number of criteria need to be satisfied, only specific criteria need to be satisfied, and/or only one criteria needs to be satisfied before the auto-play functionality may turn off (e.g., electronic gaming device 100 and/or electronic gaming system 200 may chose the criteria: you want to auto-play at most __35_ minutes only, auto-play until your credit reaches __550_, you want to quit auto-play if your credit falls below __3_, quit auto-play if you don't win for __15_ straight games, quit auto-play if you've won __30_ straight games, quit auto-play if a single game wins over __8000_ credits, quit auto-play after a total of __70_ winning games, quit auto-play after a total of __50_ losing games, you want to auto-play at most 80_ games, auto-play until a total of __400_ credits is spent, quit auto-play if __30_ out of __100_ games didn't win anything, and you want to quit auto-play if you hit a _progressive jackpot_. Electronic gaming device 100 and/or electronic gaming system 200 may chose all of the parameters to be satisfied before the auto-play functionality may turn off).

The player may select all of the criteria. The player may set the criteria to all need to be satisfied, only a select number need to be satisfied, only specific criteria need to be satisfied, and/or only one criteria needs to be satisfied before the auto-play functionality may turn off (e.g. a player may chose the criteria: you want to auto-play at most __35_ minutes only, auto-play until your credit reaches __550_, you want to quit auto-play if your credit falls below __3_, quit auto-play if you don't win for __15_ straight games, quit auto-play if you've won __30_ straight games, quit auto-play if a single game wins over __8000_ credits, quit auto-play after a total of __70_ winning games, quit auto-play after a total of __50_ losing games, you want to auto-play at most 80_ games, auto-play until a total of __400_ credits is spent, quit auto-play if __30_ out of __100_ games didn't win anything, and you want to quit auto-play if you hit a _progressive jackpot_. The player may chose that the first criteria satisfied may turn off the auto-play functionality. The player may also choose that all of the criteria need to be satisfied before the auto-play mode may turn off. The player may also choose that only a few of the criteria need to be satisfied before the auto-play functionality turn off).

The player may use drop-down menu 608 to select the amount from the options listed (e.g., 5, 10, 30, 50, 100, etc.). Drop-down menu 608 may be a pull-down menu, a fill-in area, a voice-recognition box, and/or any other data entry image. Selected criteria 610 may list which parameters have been selected (e.g., if the player has selected drop-down menu 608 in the first parameter for 5 minutes, selected criteria 610 may read, "You want to auto-play at most 5 minutes only"). Selected criteria 610 may also list the parameters as an and/or option (e.g., if the player wants the parameters to be for the auto-play to continue for 5 minutes only or for the game to quit after hitting the jackpot event, the player may select the two parameters and change the auto-play from "and" to "or" to allow the auto-play to turn off with either of the two parameters. A player may also determine that they want electronic gaming device 100 and/or electronic gaming system 200 to decide if the criteria should both be satisfied, one criteria satisfied, and/or a combination of criteria satisfied before the auto-play functionality turns off). Selected criteria 610 may state, "None Selected," until a parameter has been selected.

Computer select auto-play button 613 may be pressed if a player would like electronic gaming device 100 and/or electronic gaming system 200 to determine the criteria for the game to play in auto-play mode. Electronic gaming device 100 and/or electronic gaming system 200 may determine that all criteria needs to be satisfied, only a select number of criteria needs to be satisfied, only specific criteria needs to be satisfied, and/or only one criteria needs to be satisfied before the auto-play functionality may turn off (e.g., the player may select computer select auto-play button 613 if the player would like electronic gaming device 100 and/or electronic gaming system 200 to determine the criteria for auto-play functionality. The computer may select for auto-play to continue for 5 minutes only or for the game to quit after hitting the jackpot event. In another example, electronic gaming device 100 and/or electronic gaming system 200 may determine the criteria to be that auto-play continues for 15 minutes only and for the game to quit after winning a total of 20 games).

Cancel button 612 may be clicked if the player determines they do not want to decide on the auto-play functionality options. This may take the player back to the main screen.

Figure 6B:
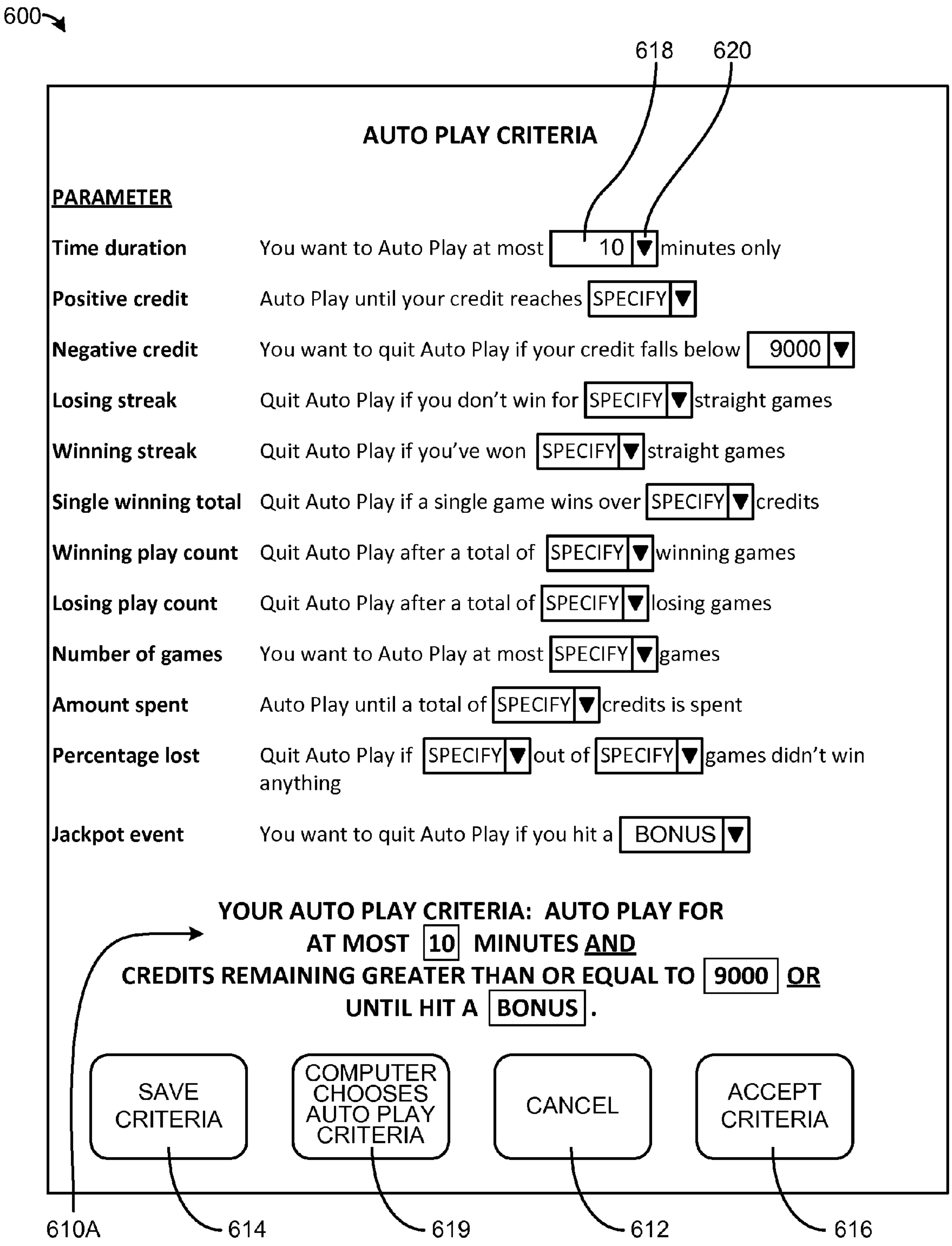
FIG. 6B is another illustration of an auto-play criteria menu, according to one embodiment.

FIG. 6B is another illustration of an auto-play criteria menu, according to one embodiment. Second image 600 may include the auto-play criteria, the parameters and examples, drop-down menu 620, a chosen criteria 618, a listed criteria 610A, a save criteria button 614, a computer choose auto-play criteria 619, cancel button 612, and an accepted criteria 616.

Auto-play criteria may be a menu of options a player may choose from in order to adapt their auto-play functionality experience. Any combination of parameters may be selected for play. Parameters may include one or more of a time duration, a positive credit, a negative credit, a losing streak, a winning streak single winning total, a winning play count, a losing play count, number of games, an amount spent, a percentage lost, and a jackpot event. One or more drop-down menus 608 may represent a pull-down menu, a fill-in area, a voice-recognition box, and/or any other data entry image. An example of each parameter 604 may include the player wants to auto-play at most _X_ minutes only (e.g., X=1, 5, 10, 70, 500, 1000, 10000, etc.), auto-play until your credit reaches _X_ (e.g., X=1, 5, 10, 70, 500, 1000, 10000, etc.), you want to quit auto-play if your credit falls below _X_ (e.g., X=1, 5, 10, 70, 500, 1000, 10000, etc.), quit auto-play if you don't win for _X_ straight games (e.g., X=1, 5, 10, 70, 500, 1000, 10000, etc.), quit auto-play if you've won _X_ straight games (e.g., X=1, 5, 10, 70, 500, 1000, 10000, etc.), quit auto-play if a single game wins over _X_ credits (e.g., X=1, 5, 10, 70, 500, 1000, 10000, etc.), quit auto-play after a total of _X_ winning games (e.g., X=1, 5, 10, 70, 500, 1000, 10000, etc.), quit auto-play after a total of _X_ losing games (e.g., X=1, 5, 10, 70, 500, 1000, 10000, etc.), you want to auto-play at most _X_ games (e.g., X=1, 5, 10, 70, 500, 1000, 10000, etc.), auto-play until a total of _X_ credits is spent (e.g., X=1, 5, 10, 70, 500, 1000, 10000, etc.), quit auto-play if _X_ out of _Y_ games didn't win anything (e.g., X=1, 5, 10, 70, 500, 1000, 10000, etc. and Y=2, 3, 4, 9, 15, 50, 100, 500, 5000, etc.), and you want to quit auto-play if you hit a jackpot. The player may select one parameter, any combination of any of the parameters, and/or ask electronic gaming device 100 and/or electronic gaming system 200 to choose the parameters before beginning auto-play (e.g., The player may select quit auto-play if you've won _X_ straight games option and also you want to auto-play at most _Y_ games option (e.g., X=1, 5, 10, 70, 500, 1000, 10000, etc. and Y=2, 3, 4, 9, 15, 50, 100, 500, 5000, etc.). The game may play until whichever of the parameters happens first and then turn-off the auto-play mode, or the game may be set to continue playing until all events have been finished).

The player may select one or a combination of any of these parameters before beginning auto-play functionality (e.g., the player may select quit auto-play if you've won __40_ straight games and also you want to auto-play at most __20_ games, etc.,). Electronic gaming device 100 and/or electronic gaming system 200 may play until one of the parameters is satisfied and then turn-off the auto-play mode, or electronic gaming device 100 and/or electronic gaming system 200 may be set to continue playing until all criteria have been satisfied. Electronic gaming device 100 and/or electronic gaming system 200 may also be set to decide if the criteria should both be met, one met, and/or a combination of factors before stopping auto-play). The player may use drop-down menu 620 to select an amount from the options listed (e.g., 1, 5, 10, 30, 100, 9000 etc.). Once a player has selected from drop-down menu 620, the amount may be displayed in chosen criteria 618 (e.g., if the player has selected drop-down menu 620 in the first parameter for 5 minutes, the first parameter may be set as, "You want to auto-play at most 5 minutes only"). Listed criteria 610A may display what the player has selected as their auto-play criteria (e.g., Auto-play for at most 10 minutes). The player may choose as many parameters as desired. The player may also set the criteria in combination with each other, and/or set the criteria against each other (e.g., auto-play for at most 10 minutes and credits remaining greater than or equal to 9000 or until hit a bonus), and/or the player may select that electronic gaming device 100 and/or electronic gaming system 200 determines if the criteria should both be met, one met, and/or a combination of factors before the auto-play functionality turns off. Any number of criteria may be set in combination and/or against each other.

Save criteria button 614 may allow the player to save their chosen criteria into a profile, which may be used at a later time by using their player's card. The casino, electronic gaming device 100, and/or electronic gaming system 200 may decide that only the elite players may have the ability to save different profiles. The casino, electronic gaming device 100, and/or electronic gaming system 200 may determine if a certain number of profiles are saved, the player may be awarded different things in order to encourage players to continuously use their profiles and/or to enhance their playing experience (e.g., a casino may award a player 20 comps if the player saves five or more profiles onto their player's card).

Computer choose auto-play criteria 619 may be pressed if a player would like electronic gaming device 100 and/or electronic gaming system 200 to determine the criteria for the game to play in auto-play mode. Electronic gaming device 100 and/or electronic gaming system 200 may determine that all criteria needs to be satisfied, only a select number of criteria needs to be satisfied, only specific criteria needs to be satisfied, and/or only one criteria needs to be satisfied before the auto-play functionality may turn off (e.g. for example, the player may select computer choose auto-play criteria 619 if the player would like electronic gaming device 100 and/or electronic gaming system 200 to determine the criteria for auto-play functionality. Electronic gaming device 100 and/or electronic gaming system 200 may select for auto-play to continue for 5 minutes only or for the game to quit after hitting the jackpot event. In another example, electronic gaming device 100 and/or electronic gaming system 200 may determine the criteria to be that auto-play continues for 15 minutes only and for the game to quit after winning a total of 20 games).

Cancel button 612 may allow the player to close the auto-play criteria window and return to the main screen. Accepted criteria button 616 may allow the player to select their chosen criteria and begin the auto-play mode.

Figure 6C:
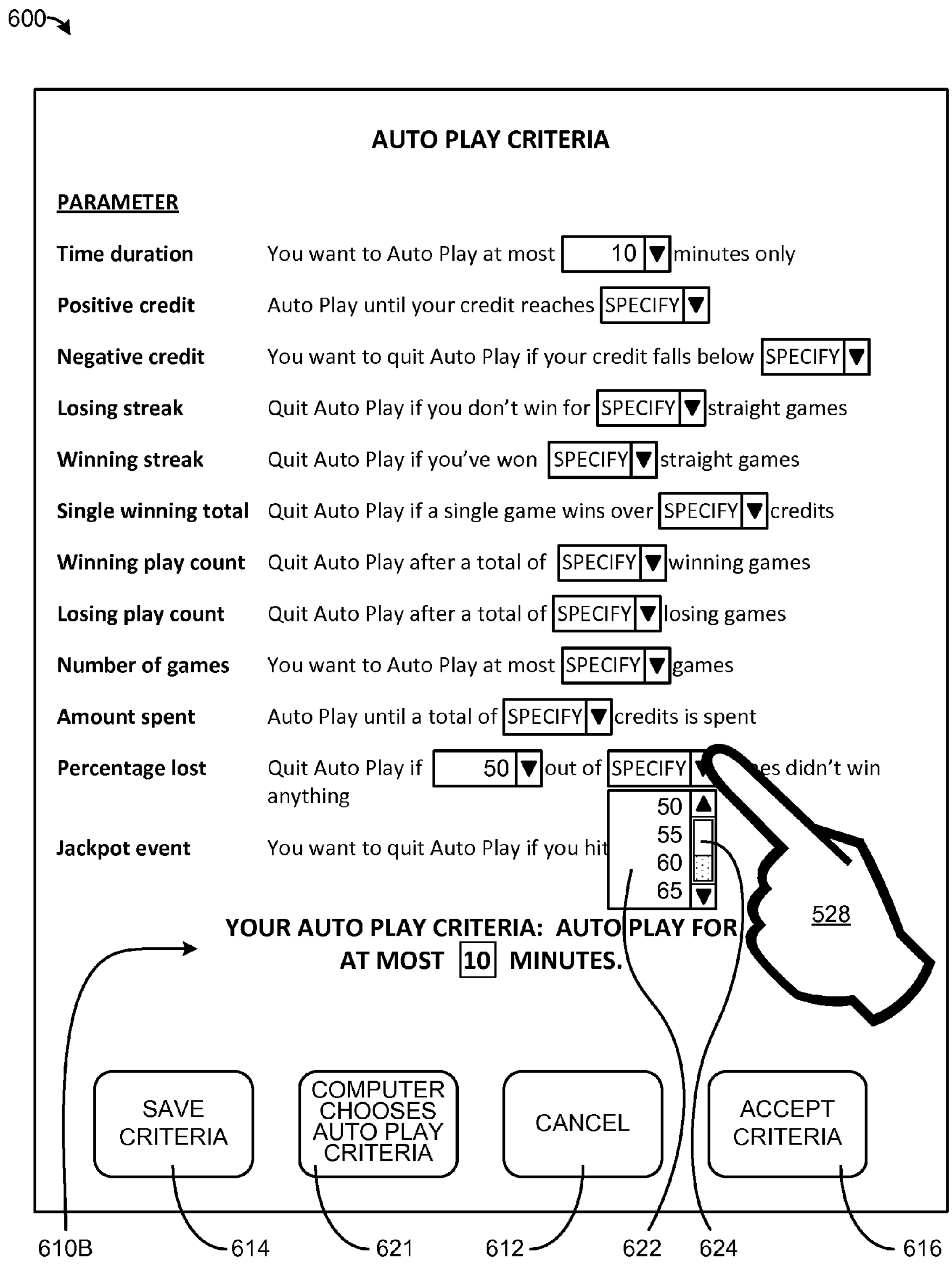
FIG. 6C is another illustration of an auto-play criteria menu, according to one embodiment.

FIG. 6C is an illustration of an auto-play criteria menu, according to one embodiment. Second image 600 may include the auto-play criteria, the parameters and examples, a drop-down list 622, a scroll button 624, hand icon 528, a chosen criteria 610B, a computer choose auto-play criteria 621, save criteria button 614, cancel button 612, and accepted criteria 616. Auto-play criteria may be a menu of options a player may choose from in order to adapt an auto-play mode experience. Any combination of parameters may be selected for play. Parameters may include one or more of a time duration, a positive credit, a negative credit, a losing streak, a winning streak single winning total, a winning play count, a losing play count, number of games, an amount spent, a percentage lost, and a jackpot event. One or more drop-down menus 608 may represent a pull-down menu, a fill-in area, a voice-recognition box, and/or any other data entry image. An example of each parameter 604 may include the player wants to auto-play at most _X_ minutes only (e.g., X=1, 5, 10, 70, 500, 1000, 10000, etc.), auto-play until your credit reaches _X_ (e.g., X=1, 5, 10, 70, 500, 1000, 10000, etc.), you want to quit auto-play if your credit falls below _X_ (e.g., X=1, 5, 10, 70, 500, 1000, 10000, etc.), quit auto-play if you don't win for _X_ straight games (e.g., X=1, 5, 10, 70, 500, 1000, 10000, etc.), quit auto-play if you've won _X_ straight games (e.g., X=1, 5, 10, 70, 500, 1000, 10000, etc.), quit auto-play if a single game wins over _X_ credits (e.g., X=1, 5, 10, 70, 500, 1000, 10000, etc.), quit auto-play after a total of _X_ winning games (e.g., X=1, 5, 10, 70, 500, 1000, 10000, etc.), quit auto-play after a total of _X_ losing games (e.g., X=1, 5, 10, 70, 500, 1000, 10000, etc.), you want to auto-play at most _X_ games (e.g., X=1, 5, 10, 70, 500, 1000, 10000, etc.), auto-play until a total of _X_ credits is spent (e.g., X=1, 5, 10, 70, 500, 1000, 10000, etc.), quit auto-play if _X_ out of _Y_ games didn't win anything (e.g., X=1, 5, 10, 70, 500, 1000, 10000, etc. and Y=2, 3, 4, 9, 15, 50, 100, 500, 5000, etc.), and you want to quit auto-play if you hit a jackpot. The player may select one parameter, any combination of any of the parameters, and/or ask electronic gaming device 100 and/or electronic gaming system 200 to choose the parameters before beginning auto-play (e.g., The player may select quit auto-play if you've won _X_ straight games option and also you want to auto-play at most _Y_ games option (e.g., X=1, 5, 10, 70, 500, 1000, 10000, etc. and Y=2, 3, 4, 9, 15, 50, 100, 500, 5000, etc.). The game may play until whichever of the parameters happens first and then turn-off the auto-play mode, or the game may be set to continue playing until all events have been finished).

Electronic gaming device 100 and/or electronic gaming system 200 may play until one of the parameters is satisfied and then turn-off the auto-play mode, and/or the game may be set to continue playing until all the events have been satisfied, and/or the game may be set to continue playing until a select number of parameters have been satisfied). The player may use drop-down list 622 to select an amount from the options listed (e.g., 1, 5, 10, 30, 55, 60, 100, etc.). Scroll button 624 may allow the player to see where they are on drop-down list 622, and may allow the player to use the up and down arrows to search the entire list of options (e.g., if a player can see 50, 55, 60, and 65, they may use the down arrow to also uncover options 70, 75, 80, 100). Hand icon 528 may allow a player to hover over an option and click on the desired option (e.g., If a player wants to select save criteria button 614, they may move hand icon 528 until it is over save criteria button 614 and then click the button). Once a player has selected from drop-down list 622, the amount may be displayed in chosen criteria 610B. Chosen criteria 610B may display what the player has selected as their auto-play criteria (e.g., auto-play for at most 10 minutes). The player may choose as many parameters as desired, and once a second option has been added, electronic gaming device 100 and/or electronic gaming system 200 may ask if the player wants the second in combination with the first, to set the two opposing each other, or to allow electronic gaming device 100 and/or electronic gaming system 200 to decide (e.g., if the player has selected auto-play for 10 minutes only and quit auto-play after a total of 4 winning games, and has selected the two criteria opposing each other, electronic gaming device 100 and/or electronic gaming system 200 may quit either after 10 minutes or 4 winning games, whichever occurs first. If a player selected auto-play for 10 minutes only and quit auto-play after a total of 4 winning games, and has selected the two criteria combining with each other, electronic gaming device 100 and/or electronic gaming system 200 may quit auto-play when both 10 minutes has elapsed and 4 winning games).

Computer choose auto-play criteria 621 may be pressed if a player would like electronic gaming device 100 and/or electronic gaming system 200 to determine the criteria for the game to play in auto-play mode. Electronic gaming device 100 and/or electronic gaming system 200 may select an auto-play functionality. Electronic gaming device 100 and/or electronic gaming system 200 may select one of the profiles off of the player's card, use the player's history to determine the parameter that would take the player the longest to complete, randomly select criteria, use a predetermined pattern, shuffle, any combination thereof, and/or any other selection method. Electronic gaming device 100 and/or electronic gaming system 200 may determine that all criteria needs to be satisfied, only a select number of criteria needs to be satisfied, only specific criteria needs to be satisfied, and/or only one criteria needs to be satisfied before the auto-play functionality may turn off (e.g. electronic gaming device 100 and/or electronic gaming system 200 may select for auto-play to continue for 5 minutes only or for the game to quit after hitting the jackpot event, which may be on the player's card as Profile One. In another example, electronic gaming device 100 and/or electronic gaming system 200 may determine the criteria to be that auto-play continues for 15 minutes only and for the game to quit after winning a total of 20 games, which may be the player's preferred auto-play mode. In another example, electronic gaming device 100 and/or electronic gaming system 200 may determine the criteria to be that auto-play continues for 15 minutes only and for the game to quit after winning a total of 20 games).

Save criteria button 614 may allow the player to save their chosen criteria into a profile. Profiles may be used at a later time when accessed by the player's identification card. The casino, electronic gaming device 100, and/or electronic gaming system 200 may decide that only the elite players may have the ability to save different profiles. The casino, electronic gaming device 100, and/or electronic gaming system 200 may determine if a certain number of profiles are saved, the player may be awarded different things in order to encourage players to continuously use their profiles and/or to enhance their playing experience (e.g., a casino may award a player 20 comps if the player saves five or more profiles onto their player's card). Cancel button 612 may allow the player to turn off the auto-play criteria window and return to the main screen. Accepted criteria 616 may allow the player to select their chosen criteria and begin the auto-play mode.

Figure 6D:
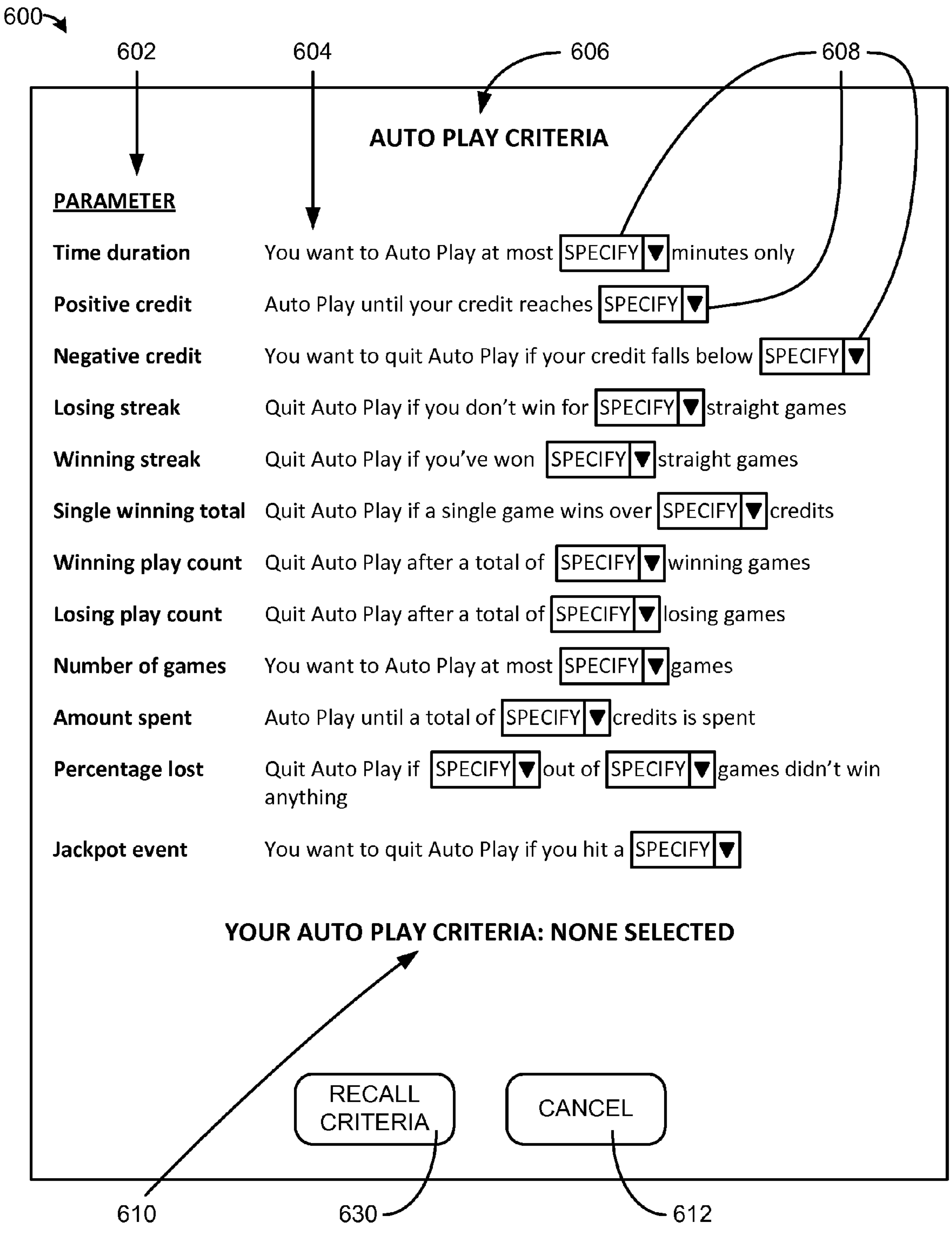
FIG. 6D is another illustration of an auto-play criteria menu, according to one embodiment.

FIG. 6D is an illustration of an auto-play criteria menu, according to one embodiment. Second image 600 may include auto-play criteria 606, parameters 602, examples 604, drop-down list 608, chosen criteria 610, recall criteria button 630, and cancel button 612. Auto-play criteria 606 may be a menu of parameters 602 that a player may choose from in order to manipulate the auto-play functionality. Any combination of parameters 602 may be selected for play. Parameters 602 may include may include one or more of a time duration, a positive credit, a negative credit, a losing streak, a winning streak single winning total, a winning play count, a losing play count, number of games, an amount spent, a percentage lost, and a jackpot event. One or more drop-down menus 608 may represent a pull-down menu, a fill-in area, a voice-recognition box, and/or any other data entry image. An example of each parameter 604 may include the player wants to auto-play at most _X_ minutes only (e.g., X=1, 5, 10, 70, 500, 1000, 10000, etc.), auto-play until your credit reaches _X_ (e.g., X=1, 5, 10, 70, 500, 1000, 10000, etc.), you want to quit auto-play if your credit falls below _X_ (e.g., X=1, 5, 10, 70, 500, 1000, 10000, etc.), quit auto-play if you don't win for _X_ straight games (e.g., X=1, 5, 10, 70, 500, 1000, 10000, etc.), quit auto-play if you've won _X_ straight games (e.g., X=1, 5, 10, 70, 500, 1000, 10000, etc.), quit auto-play if a single game wins over _X_ credits (e.g., X=1, 5, 10, 70, 500, 1000, 10000, etc.), quit auto-play after a total of _X_ winning games (e.g., X=1, 5, 10, 70, 500, 1000, 10000, etc.), quit auto-play after a total of _X_ losing games (e.g., X=1, 5, 10, 70, 500, 1000, 10000, etc.), you want to auto-play at most _X_ games (e.g., X=1, 5, 10, 70, 500, 1000, 10000, etc.), auto-play until a total of _X_ credits is spent (e.g., X=1, 5, 10, 70, 500, 1000, 10000, etc.), quit auto-play if _X_ out of _Y_ games didn't win anything (e.g., X=1, 5, 10, 70, 500, 1000, 10000, etc. and Y=2, 3, 4, 9, 15, 50, 100, 500, 5000, etc.), and you want to quit auto-play if you hit a jackpot. The player may select one parameter, any combination of any of the parameters, and/or ask electronic gaming device 100 and/or electronic gaming system 200 to choose the parameters before beginning auto-play (e.g., The player may select quit auto-play if you've won _X_ straight games option and also you want to auto-play at most _Y_ games option (e.g., X=1, 5, 10, 70, 500, 1000, 10000, etc. and Y=2, 3, 4, 9, 15, 50, 100, 500, 5000, etc.). The game may play until whichever of the parameters happens first and then turn-off the auto-play mode, and/or the game may be set to continue playing until all events have been finished). The player may select one or a combination of any of parameters examples 604 before beginning the auto-play mode (e.g., the player may select "quit auto-play if you've won _X_ straight games" and also "you want to auto-play at most _Y_ games". Electronic gaming device 100 and/or electronic gaming system 200 may play until whichever of the parameters happens first and then turn-off the auto-play mode, or electronic gaming device 100 and/or electronic gaming system 200 may be set to continue playing until all the events have finished, or electronic gaming device 100 and/or electronic gaming system 200 may be set to determine the auto-play criteria). The player may use drop-down list 608 to select the amount from the options available (e.g., 1, 5, 10, 30, 55, 60, 100, etc.). Once a player has selected from drop-down list 608, the amount may be displayed in chosen criteria 610. Chosen criteria 610 may display what the player has selected as their auto-play criteria (e.g., auto-play for at most 10 minutes). The player may choose as many parameters as desired. When a second option has been added, electronic gaming device 100 and/or electronic gaming system 200 may ask if the player wants the second in combination with the first or to set the two opposing each other (e.g., if the player has selected "auto-play for 10 minutes only" and "quit auto play after a total of 4 winning games", and has selected the two criteria opposing each other, electronic gaming device 100 and/or electronic gaming system 200 may quit auto-play either after 10 minutes or 4 winning games, whichever happens first. If a player selected "auto-play for 10 minutes only" and "quit auto play after a total of 4 winning games", and has selected the two criteria combining with each other. Electronic gaming device 100 and/or electronic gaming system 200 may quit when it had been both 10 minutes and 4 winning games).

Chosen criteria 610 may read "None Selected" until the player has changed one of example 604 drop-drown list 608. Recall criteria button 630 may reset all of the drop-down lists 608 to "Specify" (e.g., if a player has chosen one drop-down lists 608, but then changes his mind, the player may click on recall criteria button 630 to reset all of the options). Any number of examples 604 may be filled in before hitting recall criteria button 630. Once recall criteria button 630 has been clicked, all drop-down lists 608 may return to stating, "Specify". This feature may allow players to put in various criteria into drop-down list 608 to see how it looks on chosen criteria 610 before playing with the understanding that they can easily erase all of the chosen parameters (e.g., a player has selected "auto-play until a total of 10 credits are spent" and "auto-play until a total of 4 winning games." The information is listed in the player's chosen criteria 610. The player may then click on recall criteria button 630 to reset all of the options. Chosen criteria 610 may state, "Non Selected," until the player makes a new selection). Cancel button 612 may allow the player to turn off the auto-play criteria window and return to the main screen.

Figure 6E:
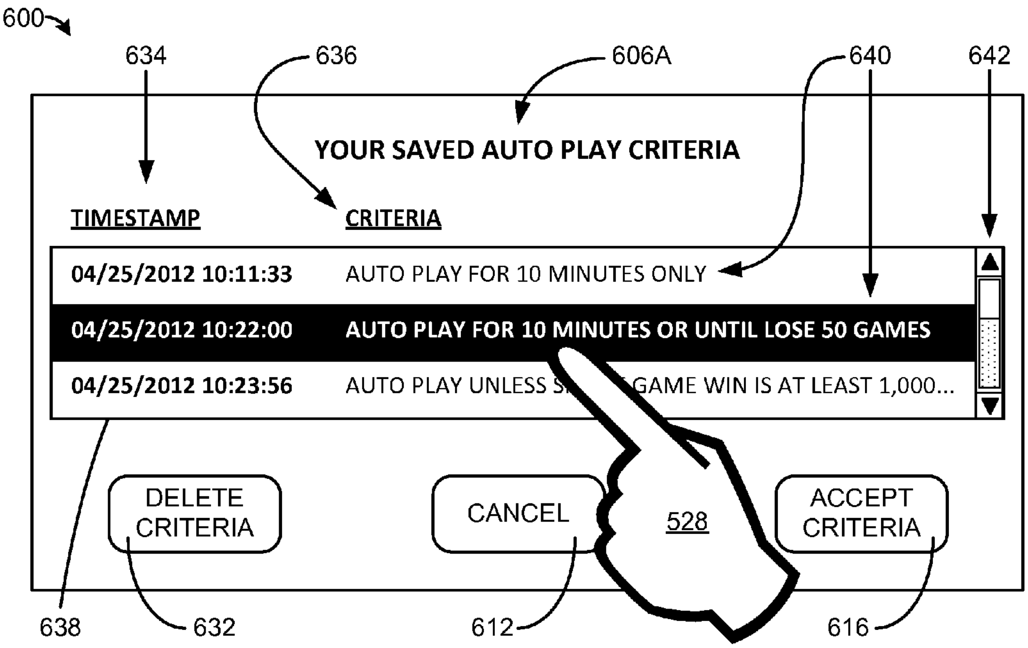
FIG. 6E is an illustration of a saved auto-play criteria menu, according to one embodiment

FIG. 6E is an illustration of a saved auto-play criteria menu, according to one embodiment. Second image 600 may include a saved auto-play criteria 606A, a time stamp 634, a criteria 636, a criteria window 638, a profile name one 637, a profile name two 635, a profile criteria list 640, a scroll bar 642, hand icon 528, a delete criteria button 630, cancel button 612, and an accept criteria button 616. Saved auto-play criteria 606A may be a list of previously saved parameters that the player may choose from in order to manipulate their auto-play functionality experience. The player may create a profile name for each of the saved options. Each saved option may have a time entered into time stamp 634 (e.g., profile one 637 was created on Apr. 25, 2012 at 10:11:33). Each saved profile may include the selected options as criteria 636 (e.g., the player saved profile one 637, which included auto-play for 10 minutes only, as the criteria.) The player may use hand icon 528 to select between the different criteria 640, to click on the up/down arrows or the scroll bar on scroll bar 642, to select delete criteria button 630, to select cancel button 612, to select accept criteria button 616, and/or for any other purpose. The player may select delete criteria 632 to erase a profile (e.g., the player may want to erase profile 637. The player may click on profile 637 using hand icon 528. Once profile 637 is highlighted, the player may use hand icon 528 to click on delete criteria button 632. This may remove profile 637 from profile criteria list 640). Cancel button 612 may allow the player to close the save auto-play criteria 606A window and return to the main screen (e.g., a player may want to return to the main screen if they are no longer interested in selecting from the saved criteria, or if they have finished editing their list of saved criteria). Accept criteria button 616 may be used if a player wants to play a previously saved list of criteria. The player may use hand icon 528 to highlight a specific profile from profile criteria list 640. Once highlighted, the player may use hand icon 528 to click accept criteria button 616. The player may also use the touch-screen option to select a profile criteria list 640.

Figure 7A:
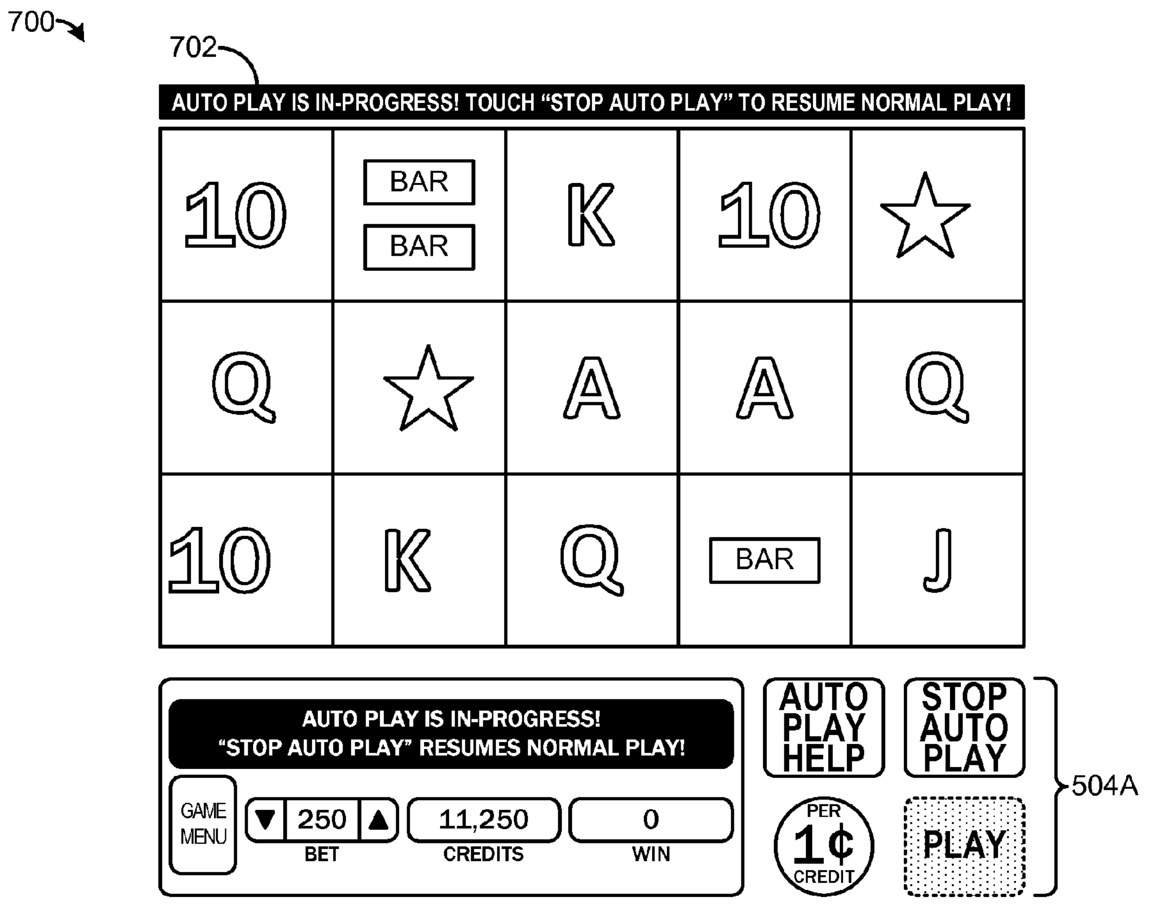
FIG. 7A is an illustration of an auto-play game play with a game menu, according to one embodiment.

FIG. 7A is an illustration of an auto-play game play with a game menu, according to one embodiment. A third image 700 may include an auto-play label 702, stop auto-play button 504, and play button 506. Auto-play label 702 may alert the player that electronic gaming device 100 and/or electronic gaming system 200 is in auto-play mode. The label may read, "Auto-play is in progress! Touch 'Stop Auto-Play' to resume normal play!" Auto-play label may blink, be highlighted, move, change colors, and/or change in any way. On the game menu, stop auto-play button 504 may be pressed at any time to turn off the auto-play mode (e.g., if a player needs to use the restroom and does not want to miss a spin, they may press stop auto-play button 504 to stop electronic gaming device 100 and/or electronic gaming system 200 from continuing while they were gone). Stop auto-play button may blink, be highlighted, move, change colors, and/or change in any way. Play button 506 may be a darker color, shadowed, a different color, or in some way different from the other buttons to indicate that the button cannot be pressed. This may signify to the player that a different mode, like the auto-play functionality, is in progress and they do not need to use play button 506 until the auto-play game is finished. Any of the buttons may be a different color, blink, move, and/or be different in any way.

Figure 7B:
FIG. 7B is another illustration of a game menu, according to one embodiment.

FIG. 7B is another illustration of a game menu, according to one embodiment. A fourth image 504A may include an auto-play label 506A, a stop auto-play button 526A, and a play button 522A. Auto-play label 506A may alert the player that electronic gaming device 100 and/or electronic gaming system 200 is in auto-play mode. The label may read, "Auto-play is in progress! Touch 'Stop Auto-Play' to resume normal play!" Auto-play label 506A may blink, be highlighted, move, change colors, and/or change in any way. Stop auto-play button 526A may be pressed at any time to turn off the auto-play mode (e.g., if a player needs to use the restroom and does not want to miss a spin, they may press stop auto-play button 526A to stop electronic gaming device 100 and/or electronic gaming system 200 from continuing while they were gone). Stop auto-play button 526A may blink, be highlighted, move, change colors, and/or change in any way. Play button 522A may be a darker color, a different color, shadowed, and/or in some way different from the other buttons to indicate that the button cannot be pressed. This may signify to the player that a different mode, the auto-play functionality mode, is in progress and they do not need to use play button 522A until the auto-play functionality is finished.

Figure 7C:
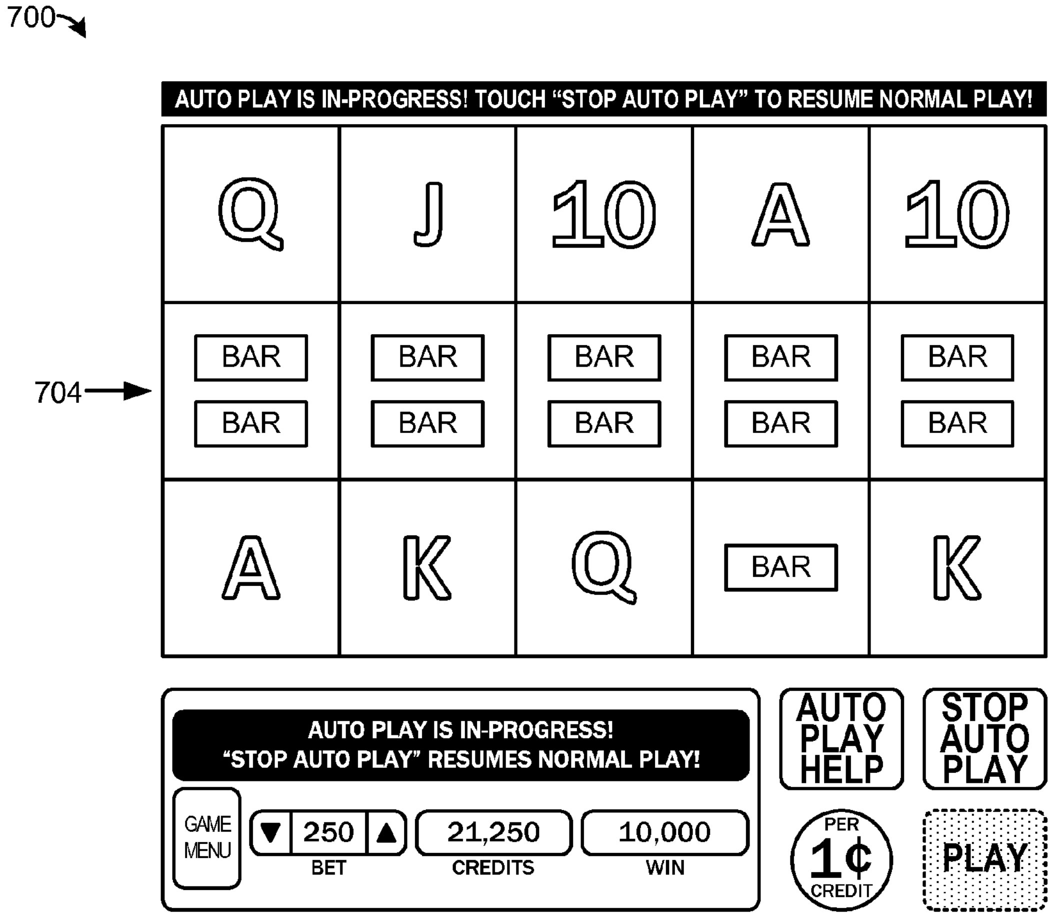
FIG. 7C is an illustration of an auto-play game play with a game menu, according to one embodiment.

FIG. 7C is an illustration of an auto-play game play with a game menu, according to one embodiment. Third image 700 may include a row of bar icons 704 in auto-play functionality mode. Row of bar icons 704 may indicate a winning spin.

For example, a player may have selected the auto-play parameter that if the spin hits a jackpot spin, the auto-play mode should turn off. In this example, when all the bar icons align in row of bar icons 704, the player has won the jackpot. This may immediately turn off the auto-play mode. This payline may light up, jiggle, move, flash, and/or change in any way.

Figure 7D:
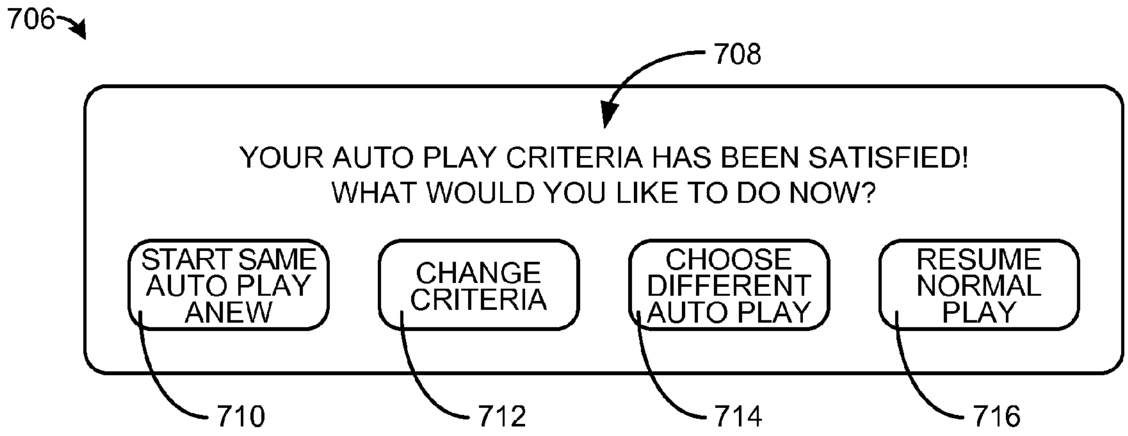
FIG. 7D is an illustration of an auto-play menu, according to one embodiment

FIG. 7D is an illustration of an auto-play menu, according to one embodiment. A fifth image 706 may include a satisfied label 708, a start same auto-play anew button 710, a change criteria button 712, a choose different auto-play button 714, and a resume normal play button 716. Fifth image 706 may pop-up, flash, blink, move across the screen, and/or change in any way. Satisfied label 708 may state, "Your auto-play criteria has been satisfied! What would you like to do now?" This wording may flash, fade in and out, blink, jiggle, and/or move in any way. Start same auto-play anew button 710 may be pressed if a player would like to begin a new game using the same auto-play criteria as the game just completed (e.g., if electronic gaming device 100 and/or electronic gaming system 200 completed auto-play games until five winning games in a row, electronic gaming device 100 and/or electronic gaming system 200 may prompt the player to decide what they would like to do next. The player may click start same auto-play anew button 710 to begin electronic gaming device 100 and/or electronic gaming system 200 in auto-play mode until another five games are won in a row). Change criteria button 712 may be pressed if a player would like to begin selecting new criteria for the auto-play mode or if the player would like to review what auto-play mode was used in the past games (e.g., if electronic gaming device 100 and/or electronic gaming system 200 completed auto-play games until five winning games in a row and then prompted the player to decide what they would like to do next, the player may click change criteria button 712 to begin selecting the new criteria for the upcoming games or to review what criteria was being used for the previous games). Choose different auto-play button 714 may be pressed if a player would like to select different auto-play criteria, if a player wants to see what auto-play criteria was being previously played, or if a player wants to select multiple auto-play criteria to be used simultaneously (e.g., if a player previously had the auto-play criteria of winning five consecutive games before the auto-play mode turned off, and the player wants to change the criteria to something different, the player may click choose different auto-play button 714. Then the player may select any number of criteria for electronic gaming device 100 and/or electronic gaming system 200 to play in auto-play functionality, such as to quit auto-play after 10 games and/or to quit auto-play after 5 losing games in a row). Resume normal play button 716 may allow a player to return electronic gaming device 100 and/or electronic gaming system 200 to normal play from the auto-play mode. The auto-play function may then be turned off until the player selects auto-play again (e.g., a player may want to play a few rounds of auto-play mode, then return to normal play, and then turn the auto-play functionality back on).

Figure 8:
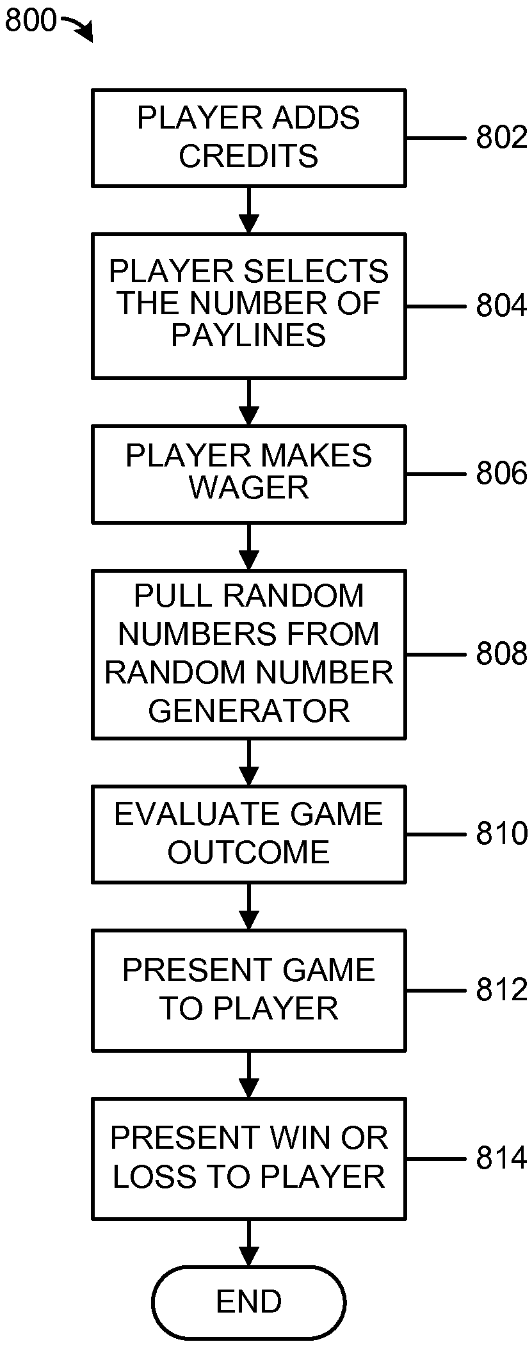
FIG. 8 is a flow diagram for game play, according to one embodiment.

In FIG. 8, a first process flowchart 800 of game play is shown, according to one embodiment. The method may include the game play starting. The method may include electronic gaming device 100 and/or electronic gaming system 200 receiving credits (step 802). The method may include electronic gaming device 100 and/or electronic gaming system 200 receiving payline selections from a player (step 804). The method may include electronic gaming device 100 and/or electronic gaming system 200 receiving a wager (step 806). The method may include electronic gaming device 100 and/or electronic gaming system 200 pulling one or more random numbers from a random number generator (step 808). The method may include electronic gaming device 100 and/or electronic gaming system 200 evaluating the game outcome (step 810). The method may include presenting the game (step 812). The method may include displaying the game outcome (step 814). The method may end.

Figure 9:
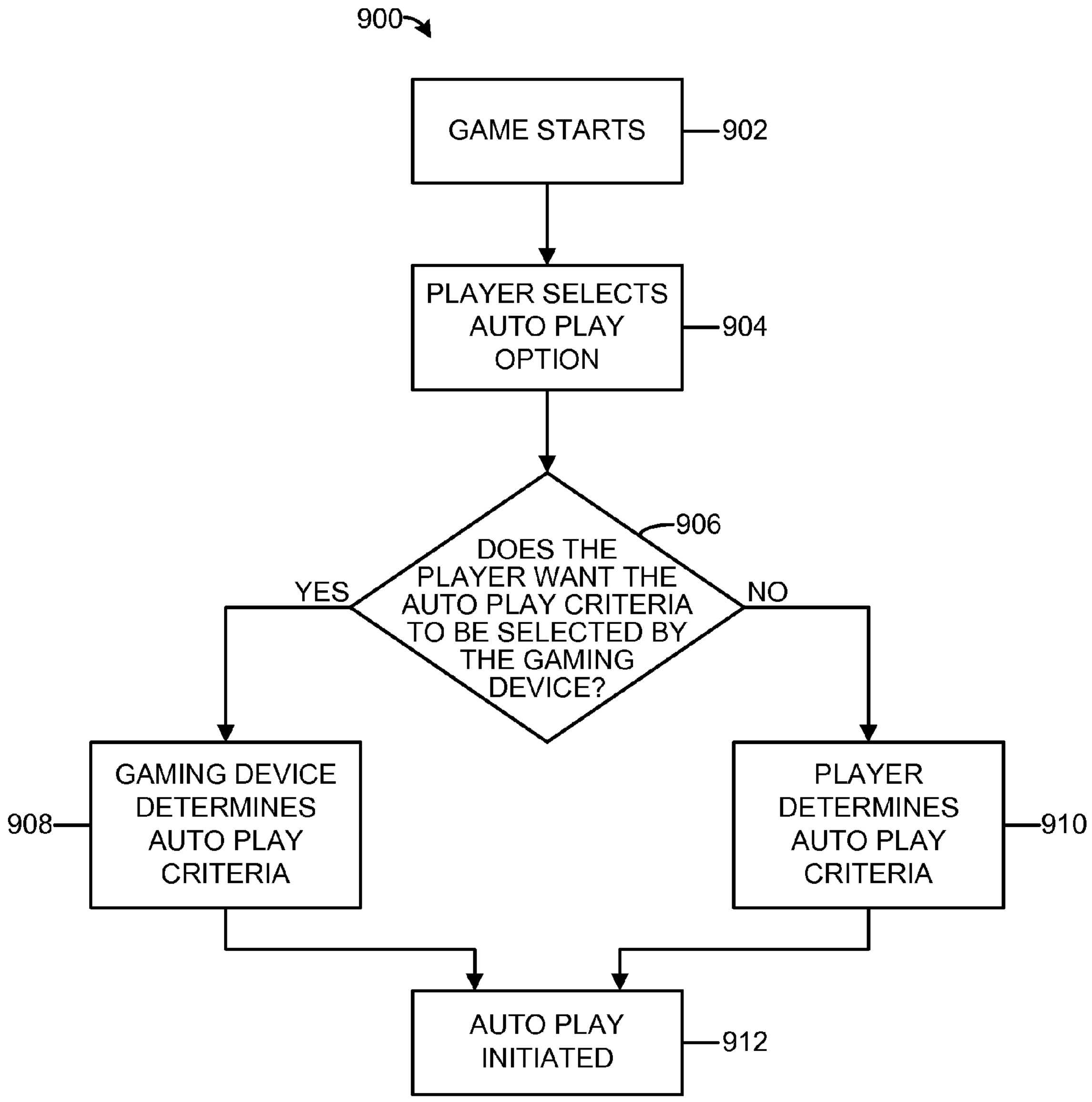
FIG. 9 is another flow diagram for game play, according to one embodiment.

FIG. 9 shows a second process flowchart 900 for game play, according to one embodiment. The method may include starting game play (step 902). Further, the method may include the player selecting the auto-play option (step 904). The player may select if they want electronic gaming device 100 and/or electronic gaming system 200 to determine auto-play (step 906). If the player wants electronic gaming device 100 and/or electronic gaming system 200 to determine auto-play mode, the method may then allow electronic gaming device 100 and/or electronic gaming system 200 to determine the auto-play criteria (step 908). If the player does not want electronic gaming device 100 and/or electronic gaming system 200 to determine auto-play functionality, the method may then allow the player to select the auto-play criteria (step 910). The method may then move to initiate auto-play (step 912).

Any combination of criteria may be selected by electronic gaming device 100 and/or electronic gaming system 200. If more than one criteria is selected by electronic gaming device 100 and/or electronic gaming system 200, the criteria may be combine or opposing each other to turn off the auto-play mode when one of the criteria is completed. For example, if a player answered yes to allowing electronic gaming device 100 and/or electronic gaming system 200 to determine the auto-play criteria (step 906), electronic gaming device 100 and/or electronic gaming system 200 may select the criteria that the auto-play mode may continue for 55 consecutive games.

Electronic gaming device 100 and/or electronic gaming system 200 may select an auto-play functionality. Electronic gaming device 100 and/or electronic gaming system 200 may select one of the profiles off of the player's card, use the player's history to determine the parameter that would take the player the longest, randomly select criteria, and/or use any other method to determine the criteria.

Another example may be if a player answered yes to allowing electronic gaming device 100 and/or electronic gaming system 200 to determine the auto-play criteria (step 906), electronic gaming device 100 and/or electronic gaming system 200 may select the criteria that the auto-play may continue until the game has played for both 15 minutes and 30 consecutive games.

Another example may be if a player answered yes to allowing electronic gaming device 100 and/or electronic gaming system 200 to determine the auto-play criteria (step 906), electronic gaming device 100 and/or electronic gaming system 200 may select the criteria that the auto-play may continue until the game hits the jackpot or 30 minutes lapses.

Another example may be if a player answered yes to allowing electronic gaming device 100 and/or electronic gaming system 200 to determine the auto-play criteria (step 906), electronic gaming device 100 and/or electronic gaming system 200 may select the criteria that the auto-play functionality may continue until the player's credit reaches 200 or the player wins 50 out of 100 games. The player, electronic gaming device 100, and/or electronic gaming system 200 may select any combination of criteria for auto-play functionality.

If more than one criteria is selected by the player, electronic gaming device 100, and/or electronic gaming system 200, the criteria may be combined or terminated when one of the criteria is completed. For example, if a player answered no to allowing electronic gaming device 100 and/or electronic gaming system 200 to determine the auto-play criteria (step 906), the player may manually select the criteria that the auto-play functionality may continue for 25 consecutive games.

Another example may be if a player answered no to allowing electronic gaming device 100 and/or electronic gaming system 200 to determine the auto-play criteria (step 906), the player may select the criteria that the auto-play functionality may continue until the game has played for both 12 minutes and 5 consecutive games.

Another example may be if a player answered no to allowing electronic gaming device 100 and/or electronic gaming system 200 to determine the auto-play criteria (step 906), the player may select the criteria that the auto-play functionality may continue until the game hits the jackpot or 20 minutes lapses.

Another example may be if a player answered no to allowing electronic gaming device 100 and/or electronic gaming system 200 to determine the auto-play criteria (step 906), the player may select the criteria that the auto-play functionality may continue until the player's credit reaches 300 or the player wins 30 out of 100 games.

Figure 10:
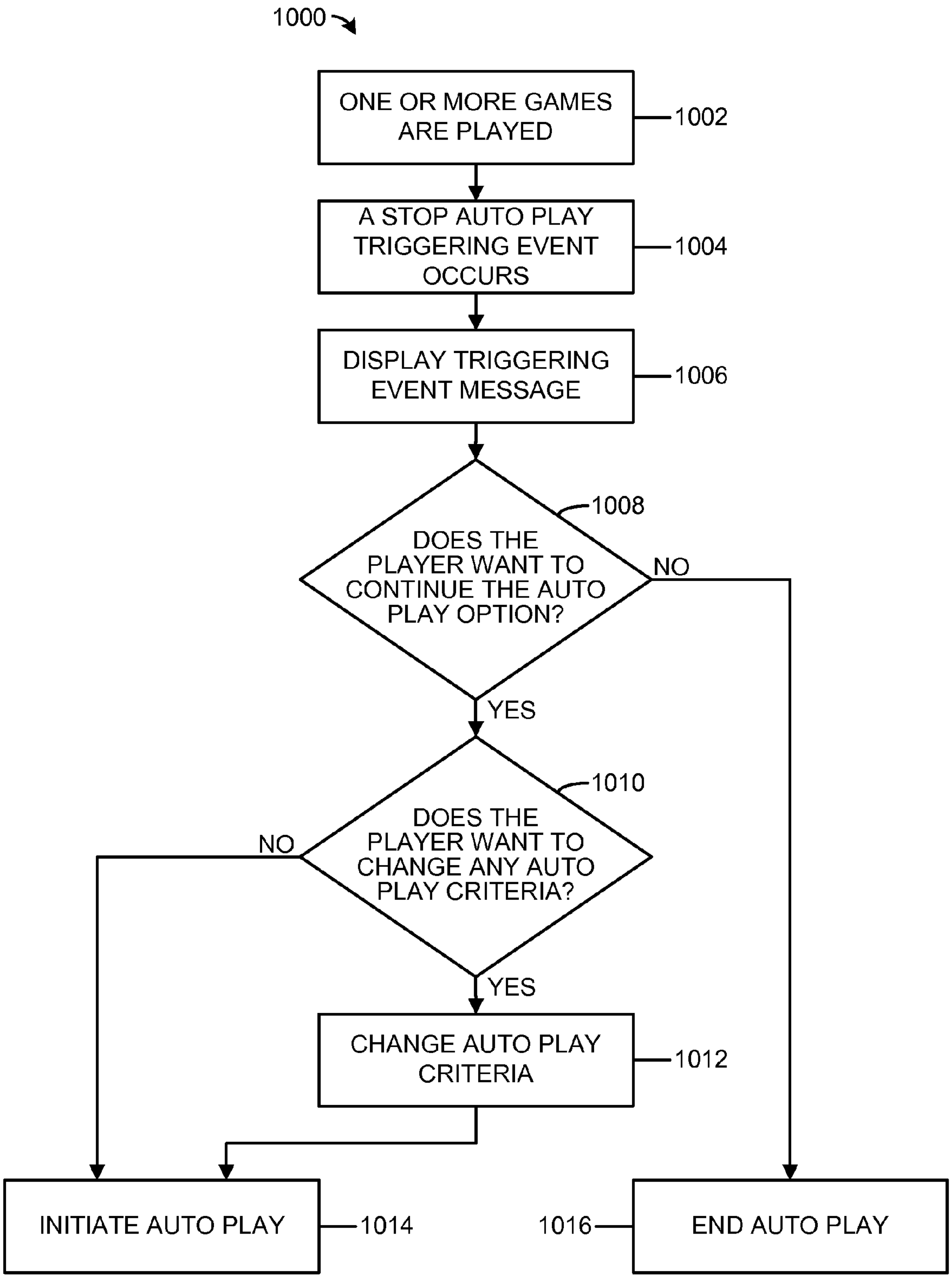
FIG. 10 is another flow diagram for game play, according to one embodiment.

FIG. 10 is a flow diagram 1000 for game play, according to one embodiment. The method may include that one or more games are played (step 1002). The method may include a stop auto-play triggering event occurring (step 1004). The method may include displaying one or more triggering events (step 1006). The method may include electronic gaming device and/or electronic gaming system determining whether the player wants to continue the auto play option (step 1008). The player may answer no and the method may then move to end auto-play (step 1016). The player may answer yes, and then the method may then move to asking the player if they want to change any auto-play criteria (step 1010). The player may answer no, and then the method may then move to initiate auto-play (step 1014). The player may answer yes, and then the method may then allow the player to change the auto-play criteria (step 1012). The method may then move to initiating the auto-play mode (step 1014).

Stop auto-play triggering event 1004 may occur for many reasons. For example, if a player wants to use the restroom, but not miss any games, they may initiate the stop auto-play functionality. Another example may be if a player wants to stop using auto-play functionality to play a few games in standard mode. Another example may be if a player wants to change the criteria of their auto-play, they may first cause a triggering event to make the changes. Each of these and more may result in electronic gaming device 100 and/or electronic gaming system 200 then moving to end auto-play (step 1016). A triggering event may include, but is not limited to, a player using their hand to press the touch screen on electronic gaming device 100 and/or electronic gaming system 200, a player using the hand icon to click the stop auto-play button, a player pressing the stop auto-play button on their keypad, a player using set verbal words to command electronic gaming device 100 and/or electronic gaming system 200 to stop auto-play, and/or a player using predetermined facial and/or body gestures to indicate to electronic gaming device 100 and/or electronic gaming system 200 to stop auto-play functionality.

If the player indicates that they want to continue the auto-play option, the method may then move to asking the player if they want to change any auto-play criteria (step 1010). If the player is satisfied to continue playing with the current criteria, they may indicate no and initiate auto-play mode 1014. This may happen, for example, if a player has accidently hit the stop auto-play trigger, or if a player hit the stop auto-play and then changed their mind, and/or any other reason.

If the player indicates that they want to continue the auto-play option, the method may then move to asking the player if they want to change any auto-play criteria (step 1010). If the player would like to change the criteria, the method may move to the change criteria process (step 1012). In this window, a player may select from a multitude of choices for adapting their auto-play game. A player may select, for example, to have auto-play continue until the player's credit reaches 200 or the player wins 50 out of 100 games, or the player may select that auto-play continue for 25 consecutive games, or the player may select that both 12 minutes lapse and 5 consecutive games must be won before the auto-play functionality stops. The player may select any number of combinations, or single criteria for electronic gaming device 100 and/or electronic gaming system 200 to play. The player may also select that electronic gaming device 100 and/or electronic gaming system 200 chose the criteria. Once the player has indicated the criteria, the method may initiate auto-play functionality.

Figure 11:
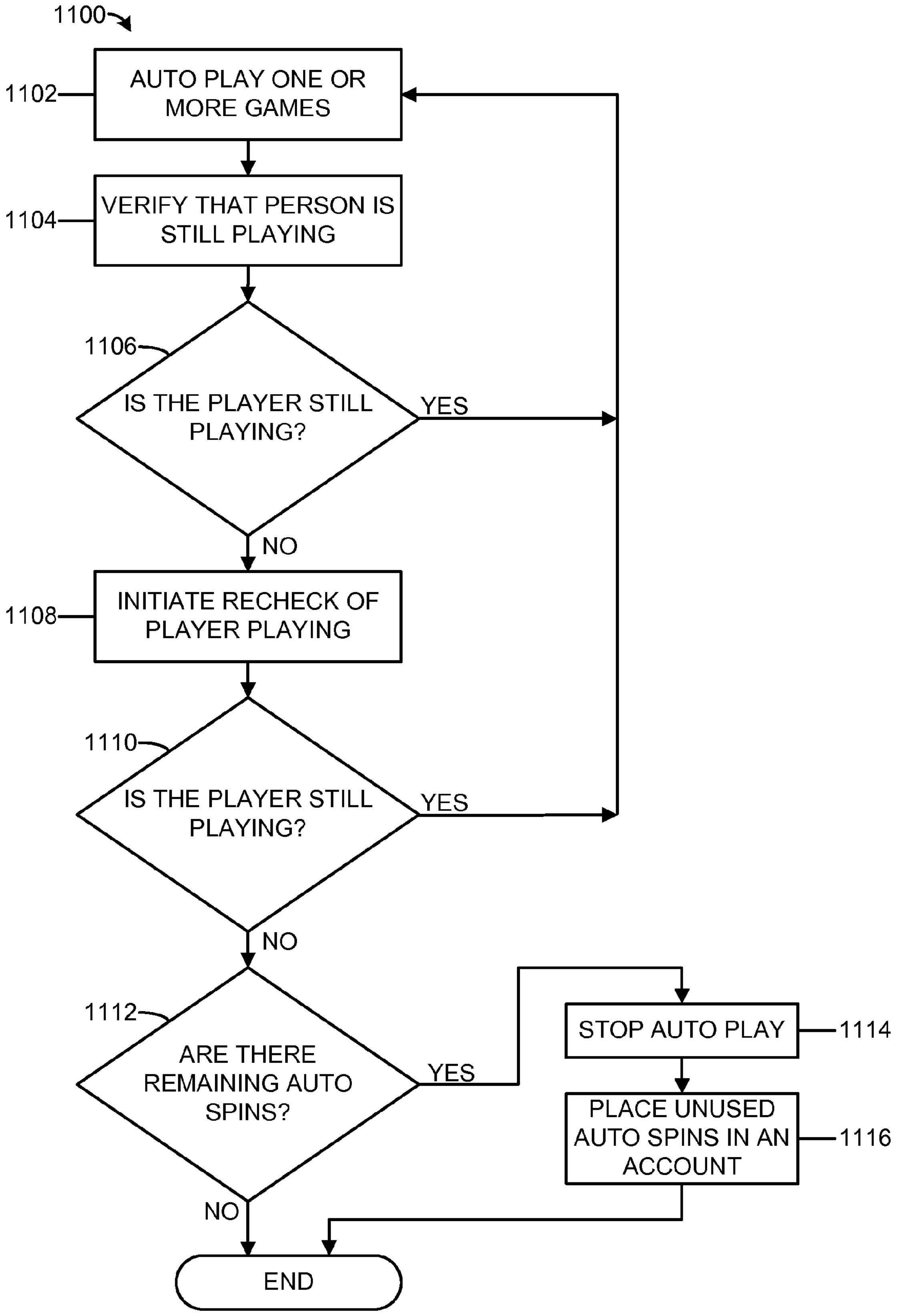
FIG. 11 is another flow diagram for game play, according to one embodiment.

FIG. 11 is a flow diagram 1100 for game play, according to one embodiment. The method may include that one or more auto-play games be played (step 1102). The method may include verifying that a player is still playing (step 1104). The method may then include that electronic gaming device 100 and/or electronic gaming system 200 questions if the player is still playing (step 1106). The method may include if the player is still playing, returning to auto-play for one or more games (step 1102). The method may include if the player is no longer playing, initiating recheck of player playing activity (step 1108). The method may include if the player is still playing, returning to auto-play for one or more games (step 1102). The method may include if the player is no longer playing, electronic gaming device 100 and/or electronic gaming system 200 determining if there are remaining auto-spins (step 1112). The method may include if there are remaining auto-spins left, electronic gaming device 100 and/or electronic gaming system 200 stopping auto-play (step 1114). The method may then include electronic gaming device 100 and/or electronic gaming system 200 placing the unused auto-spins in an account (step 1116). The method may then end (step 1117). If there are no auto-spins remaining, the method may include the end of the auto-play (step 1117).

Electronic gaming device 100 and/or electronic gaming system 200 may verify if a person is still playing electronic gaming device 100 and/or electronic gaming system 200 (step 1104). Electronic gaming device 100 and/or electronic gaming system 200 may want to determine if a person is still playing for a multitude of reasons. For example, a person may have stepped away from electronic gaming device 100 and/or electronic gaming system 200 to use the restroom or to get a drink and not realized they were in auto-play mode.

Electronic gaming device 100 and/or electronic gaming system 200 may verify if a person is still playing electronic gaming device 100 and/or electronic gaming system 200 by a variety of means. This may include, but is not limited to, pressure sensors, Kinect, cameras, motion detectors, various timed check-ins with the player, verbal response questions, and/or other verification methods.

As the auto-play functionality continues through one or more games, the method may continually determine if a player is still playing electronic gaming device 100 and/or electronic gaming system 200. If at any point, electronic gaming device 100 and/or electronic gaming system 200 determines the player is no longer at electronic gaming device 100 and/or electronic gaming system 200, electronic gaming device 100 and/or electronic gaming system 200 may determine if there are remaining auto-spins (step 1112). If there are no spins remaining, the auto-play function may stop. If there are remaining spins, the method may include placing the unused auto spins in an account (step 1116). The unused spins may be placed on the player tracking card, the remaining spins may go into the casino fund, the remaining spins may be donated to a charity fund, or a food bank, the remaining spins may be given away to another player as a bonus prize, and/or the remaining spins may be used in any other way. Once electronic gaming device 100 and/or electronic gaming system 200 has determined a player is no longer using electronic gaming device 100 and/or electronic gaming system 200, the auto-play may stop, any unused spins and/or credits may go to the determined location, and then the game may end.

In an exemplary embodiment, an electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more selected paylines (e.g., repeat paylines, patterns, scenarios, etc.). The selected paylines may be based on data received from a player. The processor may determine a selected payline's payout based on the one or more selected paylines (e.g., repeat paylines, patterns, scenarios, etc.).

In another embodiment, the processor may determine a payout based on the primary wagers. The electronic gaming device may include a network interface, which may receive data from at least one of a server and one or more gaming devices. The electronic gaming device may include a display, which may display one or more selected paylines.

In another example, the display may shade one or more non-selected paylines. The electronic gaming device may include a player preference input device. The player preference input device may modify a game configuration based on data from an identification device. The processor may multiply a prize value based on a selected payline occurrence.

In another embodiment, a method of game play may include receiving one or more primary wagers on one or more paylines. The method may include receiving a secondary wager on one or more paylines (e.g., repeat paylines, patterns, scenarios, etc.). The selected payline may be based on selection data. The selection data may be based on player input. The method may include determining one or more primary wager payouts. Further, the method may include determining one or more secondary wager payouts.

In another example, the method may include obtaining a player preference data and modifying a game configuration based on the player preference data. The method may include receiving data from at least one of a server and one or more gaming devices. The method may include multiplying a prize value based on a selected payline occurrence.

The plurality of reels may form a 5-by-5 matrix, a 3-by-5 matrix, a 4-by-5 matrix, a 4-by-3 matrix, a 5-by-3 matrix, or any number-by-any number matrix. The symbols may be an image of a card, an image, and/or other objects. For example, it may be a pot of gold, an ace of spades, a diamond, or any other symbol. The symbols may be animation. The symbols may be a picture. For example, it may be a picture of the player as taken by camera 312. The symbols may be a number. The symbols may be any image. The symbols may be blank.

The disclosed features may be part of the base game and/or a bonus game. In addition, the disclosed features may be part of a base bet and/or may require an additional side bet (e.g., ante bet).

In one embodiment, the electronic gaming device may include a plurality of reels. One or more paylines may be formed on at least a portion of the plurality of reels. The electronic gaming device may include a memory. The memory may include one or more auto-play game play structures. The electronic gaming device may include a processor. The processor may initiate the one or more auto-play game play structures.

In another example, an initiated auto-play game play structure may be based on one or more criteria selections. In another example, the one or more criteria selections may be based on a player's input. In another example, the one or more criteria selections may be based on one or more selections by the electronic gaming device.

In another example, the processor may stop one or more auto-play game structures based on one or more triggering events. In another example, the processor may stop one or more auto-play game structures based on a stop auto-play signal. In one example, an initiated auto-play game play structure may be based on one or more profiles. In one example, the one or more profiles may be based on data from a loyalty card.

In another embodiment, the method of providing gaming options via an electronic gaming device may include receiving one or more wagers on one or more paylines. The method may include receiving one or more auto-play signals. The method may include initiating one or more auto-play game structures.

In another example, the initiated auto-play game play structure may be based on one or more criteria selections. In one example, the one or more criteria selections may be based on a player's input. In another example, the one or more criteria selections may be based on one or more selections by the electronic gaming device.

In another example, the method may include stopping one or more auto-play game structures based on one or more triggering events. The method may include stopping one or more auto-play game structures based on a stop auto-play signal. The method may include that the initiated auto-play game play structure may be based on one or more profiles. In another example, the one or more profiles may be based on data from a loyalty card.

In another example, the electronic gaming system may include a server. The server may include a server memory and a server processor. The server memory may include one or more auto-play game structures. The server processor may initiate one or more auto-play game structures.

In another example, an initiated auto-play game play structure may be based on one or more criteria selections. In another example, the one or more criteria selections is based on a player's input. In another example, the server processor may stop one or more auto-play game structures based on one or more triggering events.

Gaming system may be a "state-based" system. A state-based system stores and maintains the system's current state in a non-volatile memory. Therefore, if a power failure or other malfunction occurs, the gaming system may return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it may be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a plurality of display areas;

one or more paylines formed on at least a portion of the plurality of display areas;

a memory, the memory including one or more auto-play game play structures; and a processor configured to initiate the one or more auto-play game play structures where the one or more auto-play game play structures are displayed on the electronic gaming device;

wherein the processor is configured to stop one or more auto-play game play structures based on a single game event which produced a predetermined credit amount winning event;

wherein the processor is configured to stop one or more auto-play game play structures based on at least one of a winning streak of a first length and a losing streak of a second length;

wherein the winning streak of the first length is based on generating winning events on a first number of consecutive spins;

wherein the losing streak of the second length is based on generating losing events on a second number of consecutive spins.

2. The electronic gaming device of claim 1, wherein an initiated auto-play game play structure is based on one or more criteria selections.

3. The electronic gaming device of claim 2, wherein the one or more criteria selections is based on a player's input.

4. The electronic gaming device of claim 2, wherein the one or more criteria selections is based on one or more selections by the electronic gaming device.

5. The electronic gaming device of claim 1, wherein the processor is further configured to stop one or more auto-play game play structures based on one or more triggering events.

6. The electronic gaming device of claim 1, wherein the processor is further configured to stop one or more auto-play game play structures based on a stop auto-play signal.

7. The electronic gaming device of claim 1, wherein an initiated auto-play game play structure is based on one or more profiles.

8. The electronic gaming device of claim 7, wherein the one or more profiles is based on data from a loyalty card.

9. A method of providing gaming options via an electronic gaming device comprising:

receiving one or more wagers on one or more paylines;

receiving one or more auto-play signals;

initiating one or more auto-play game play structures where the one or more auto-play game play structures are displayed on the electronic gaming device; and stopping one or more auto-play game play structures based on a single game event which produced a predetermined credit amount winning event where the stopping one or more auto-play game play structures is further based on at least one of a winning streak of a first length and a losing streak of a second length;

wherein the winning streak of the first length is based on generating winning events on a first number of consecutive spins;

wherein the losing streak of the second length is based on generating losing events on a second number of consecutive spins.

10. The method of claim 9, wherein an initiated auto-play game play structure is based on one or more criteria selections.

11. The method of claim 10, wherein the one or more criteria selections is based on a player's input.

12. The method of claim 10, wherein the one or more criteria selections is based on one or more selections by the electronic gaming device.

13. The method of claim 9, further comprising stopping one or more auto-play game play structures based on one or more triggering events.

14. The method of claim 9, further comprising stopping one or more auto-play game play structures based on a stop auto-play signal.

15. The method of claim 9, wherein an initiated auto-play game play structure is based on one or more profiles.

16. The method of claim 15, wherein the one or more profiles is based on data from a loyalty card.

17. An electronic gaming system comprising:

a server including a server memory and a server processor, the server memory including one or more auto-play game play structures;

the server processor configured to initiate the one or more auto-play game play structures where the one or more auto-play game play structures are displayed on an electronic gaming device; and wherein the server processor is configured to stop one or more auto-play game play structures based on a single game event which produced a predetermined credit amount winning event;

wherein the server processor is configured to stop one or more auto-play game play structures based on at least one of a winning streak of a first length and a losing streak of a second length;

wherein the winning streak of the first length is based on generating winning events on a first number of consecutive spins;

wherein the losing streak of the second length is based on generating losing events on a second number of consecutive spins.

18. The electronic gaming system of claim 17, wherein an initiated auto-play game play structure is based on one or more criteria selections.

19. The electronic gaming system of claim 18, wherein the one or more criteria selections is based on a player's input.

20. The electronic gaming system of claim 17, wherein the server processor is further configured to stop one or more auto-play game play structures based on one or more triggering events.

* * * * *